United States Patent
Fard et al.

(10) Patent No.: US 12,453,382 B2
(45) Date of Patent: Oct. 28, 2025

(54) SMOKING SUBSTITUTE DEVICE

(71) Applicant: Imperial Tobacco Limited, Bristol (GB)

(72) Inventors: Daniel Fard, Liverpool (GB); Oliver Talbot, Liverpool (GB); David Newns, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 0 days.

(21) Appl. No.: 18/733,550

(22) Filed: Jun. 4, 2024

(65) Prior Publication Data
US 2024/0315350 A1  Sep. 26, 2024

Related U.S. Application Data

(63) Continuation of application No. 17/001,894, filed on Aug. 25, 2020, now Pat. No. 12,035,756, which is a
(Continued)

(30) Foreign Application Priority Data

Feb. 26, 2018 (GB) .................................... 1803026
May 25, 2018 (GB) .................................... 1808611
Sep. 20, 2018 (GB) .................................... 1815356

(51) Int. Cl.
*A24F 40/53* (2020.01)
*A24F 40/10* (2020.01)
(Continued)

(52) U.S. Cl.
CPC .............. *A24F 40/53* (2020.01); *H04L 67/12* (2013.01); *H04L 67/306* (2013.01);
(Continued)

(58) Field of Classification Search
None
See application file for complete search history.

(56) References Cited

U.S. PATENT DOCUMENTS

2013/0284192 A1  10/2013  Peleg et al.
2014/0246035 A1  9/2014  Minskoff et al.
(Continued)

FOREIGN PATENT DOCUMENTS

EP  3241453 A1  11/2017
EP  3275324     1/2018
(Continued)

OTHER PUBLICATIONS

International Search Report, mailed Apr. 26, 2019, in PCT/EP2019/053502, filed Feb. 13, 2019.
(Continued)

*Primary Examiner* — Thomas S McCormack
(74) *Attorney, Agent, or Firm* — DUNLAP CODDING, P.C.

(57) ABSTRACT

A system for managing a smoking substitute device is described. The system comprises a smoking substitute device; and a mobile device configured to have a wireless connection with the smoking substitute device; wherein the system is configured to activate a geographic lock function on the smoking substitute device thereby disabling the smoking substitute device if the smoking substitute device and/or the mobile device is determined to have a geographical location that is within one or more predetermined geographical areas.

12 Claims, 15 Drawing Sheets

Related U.S. Application Data continuation of application No. PCT/EP2019/053502, filed on Feb. 13, 2019.

(51) Int. Cl.
  *A24F 40/49* (2020.01)
  *H04L 67/12* (2022.01)
  *H04L 67/306* (2022.01)
  *H04W 4/021* (2018.01)

(52) U.S. Cl.
  CPC ............ *H04W 4/021* (2013.01); *A24F 40/10* (2020.01); *A24F 40/49* (2020.01)

(56) References Cited

U.S. PATENT DOCUMENTS

| | | | |
|---|---|---|---|
| 2015/0181945 A1* | 7/2015 | Tremblay | A24F 40/60 131/328 |
| 2015/0196057 A1 | 7/2015 | Wu | |
| 2016/0007651 A1 | 1/2016 | Ampolini et al. | |
| 2016/0081393 A1 | 3/2016 | Black | |
| 2016/0158782 A1 | 6/2016 | Ampolini et al. | |
| 2017/0119040 A1 | 5/2017 | Cameron | |
| 2017/0185364 A1 | 6/2017 | Cameron | |
| 2018/0020720 A1 | 1/2018 | Matischek | |
| 2018/0043114 A1 | 2/2018 | Bowen et al. | |
| 2018/0121956 A1* | 5/2018 | DeLuca | H04W 4/021 |

FOREIGN PATENT DOCUMENTS

| | | |
|---|---|---|
| GB | 2542008 A | 3/2017 |
| GB | 2542270 A | 3/2017 |
| WO | WO 2017/205692 A1 | 11/2017 |
| WO | WO 2018/024154 A1 | 2/2018 |

OTHER PUBLICATIONS

Written Opinion of the International Searching Authority, mailed Apr. 26, 2019, in PCT/EP2019/053502, filed Feb. 13, 2019.
UKIPO Search Report (GB1803026.2), dated Aug. 14, 2018, 9 pages.
UKIPO Search Report (GB1808611.6), dated Nov. 16, 2018, 9 pages.
UKIPO Search Report (GB1815356.9), dated Mar. 27, 2019, 9 pages.

* cited by examiner

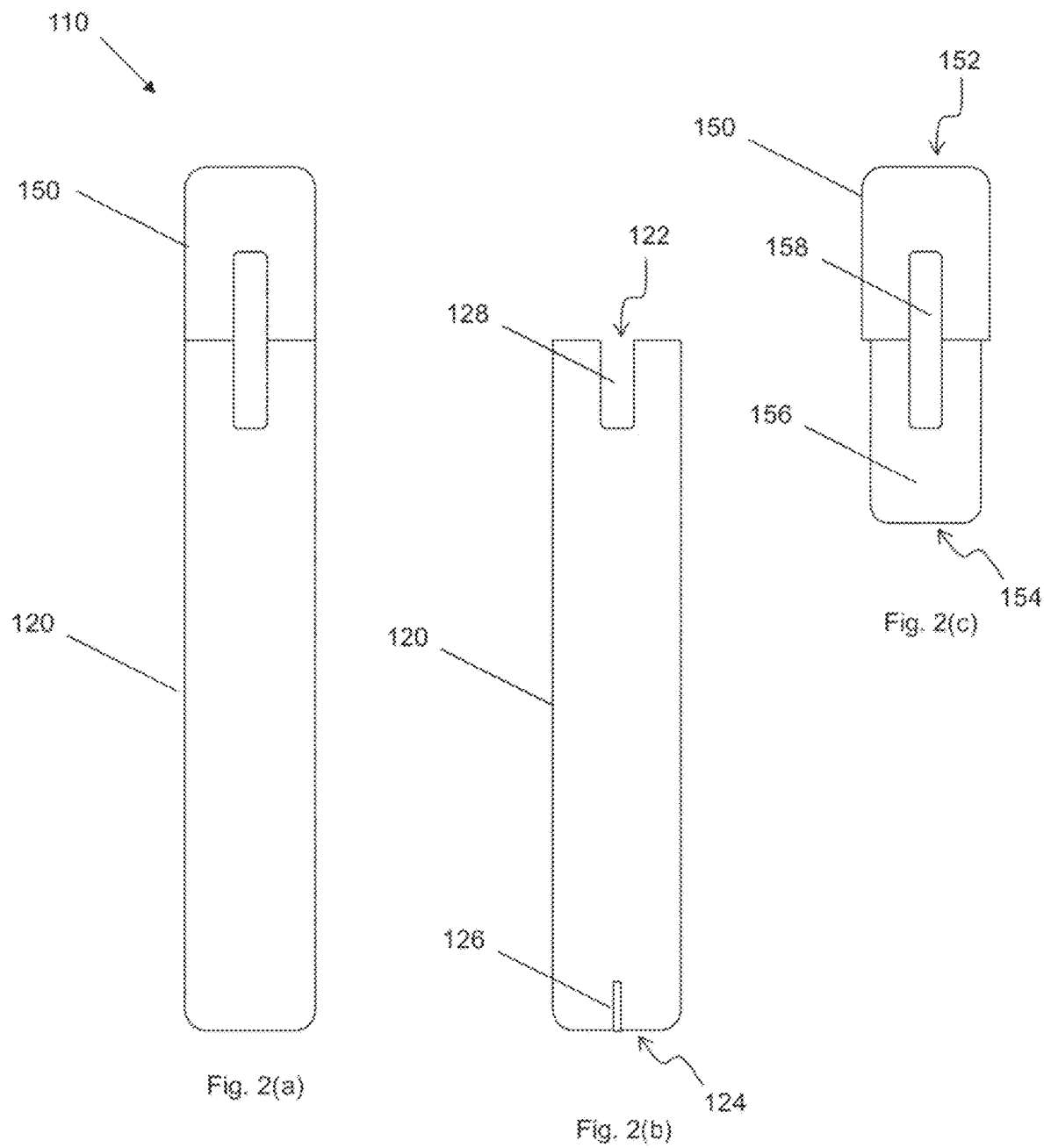

SMOKING SUBSTITUTE DEVICE

REFERENCE TO RELATED APPLICATIONS

The present patent application is a continuation of U.S. Ser. No. 17/001,894, filed on Aug. 25, 2020, which is a continuation of International Application No. PCT/EP2019/053502, filed Feb. 13, 2019; which claims priority to the patent application identified by GB Serial No. 1803026.2, filed on Feb. 26, 2018; the patent application identified by GB Serial No. 1808611.6, filed on May 25, 2018; and the patent application identified by GB Serial No. 1815356.9, filed Sep. 20, 2018. The entire contents of each of the above-referenced patent(s)/patent application(s) are hereby expressly incorporated by reference herein.

TECHNICAL FIELD

The present disclosure relates to smoking substitute devices, and particularly, although not exclusively, to disabling smoking substitute devices in certain scenarios, e.g. by providing a smoking substitute device associated with age verification functions.

BACKGROUND ART

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices, which may also be known as electronic nicotine delivery systems, may comprise electronic systems that permit a user to simulate the act of smoking by producing an aerosol, also referred to as a "vapour," which is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid," is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one into the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute device is the so-called "heat not burn" ("HNB") approach in which tobacco (rather than e-liquid) is heated or warmed to release vapour. The tobacco may be leaf tobacco or reconstituted tobacco. The vapour may contain nicotine and/or flavourings. In the HNB approach the intention is that the tobacco is heated but not burned, i.e. does not undergo combustion.

A typical HNB smoking substitute device may include a main body and a consumable. The consumable may include the tobacco material. The main body and consumable may be configured to be physically coupled together. In use, heat may be imparted to the tobacco material by a heating device that is typically located in the main body, wherein airflow through the tobacco material causes moisture in the tobacco material to be released as vapour. A vapour may be formed from a carrier in the tobacco material (this carrier may for example include propylene glycol and/or vegetable glycerin) and additionally volatile compounds released from the tobacco. The released vapour may be entrained in the airflow drawn through the tobacco.

As the vapour passes through the smoking substitute device (entrained in the airflow) from an inlet to a mouthpiece (outlet), the vapour cools and condenses to form an aerosol (also referred to as a vapour) for inhalation by the user. The aerosol will normally contain the volatile compounds.

In HNB smoking substitute devices, heating as opposed to burning the tobacco material is believed to cause fewer, or smaller quantities, of the more harmful compounds ordinarily produced during smoking. Consequently, the HNB approach may reduce the odour and/or health risks that can arise through the burning, combustion and pyrolytic degradation of tobacco.

An example of the HNB approach is the IQOS® smoking substitute device from Philip Morris Ltd. The IQOS® smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HNB approach is the device known as "Glo"® from British American Tobacco p.l.c. Glo® comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g. a cigarette). The tobacco may contain high levels of aerosol formers (carrier), such as vegetable glycerine ("VG") or propylene glycol ("PG").

The present inventor(s) are concerned by the potential for smoking substitute devices to be obtained and used by unauthorised users, particularly those who are too young. For example, in the United Kingdom it is illegal to sell a person under the age of 18 smoking substitute devices and, although there is no legal minimum age for the use of smoking substitute devices, it is generally considered undesirable for persons under the age of 18 to have access to and use of smoking substitute devices.

The present disclosure has been devised in light of the above considerations.

BRIEF DESCRIPTION OF THE DRAWINGS

Embodiments of the present disclosure will now be described by way of example with reference to the accompanying drawings in which:

FIG. 2(a) shows an example smoking substitute device.

FIG. 2(b) shows the main body of the smoking substitute device of FIG. 2(a) without the consumable.

FIG. 2(c) shows the consumable of the smoking substitute device of FIG. 2(a) without the main body.

DETAILED DESCRIPTION OF THE INVENTION

Figure 1:
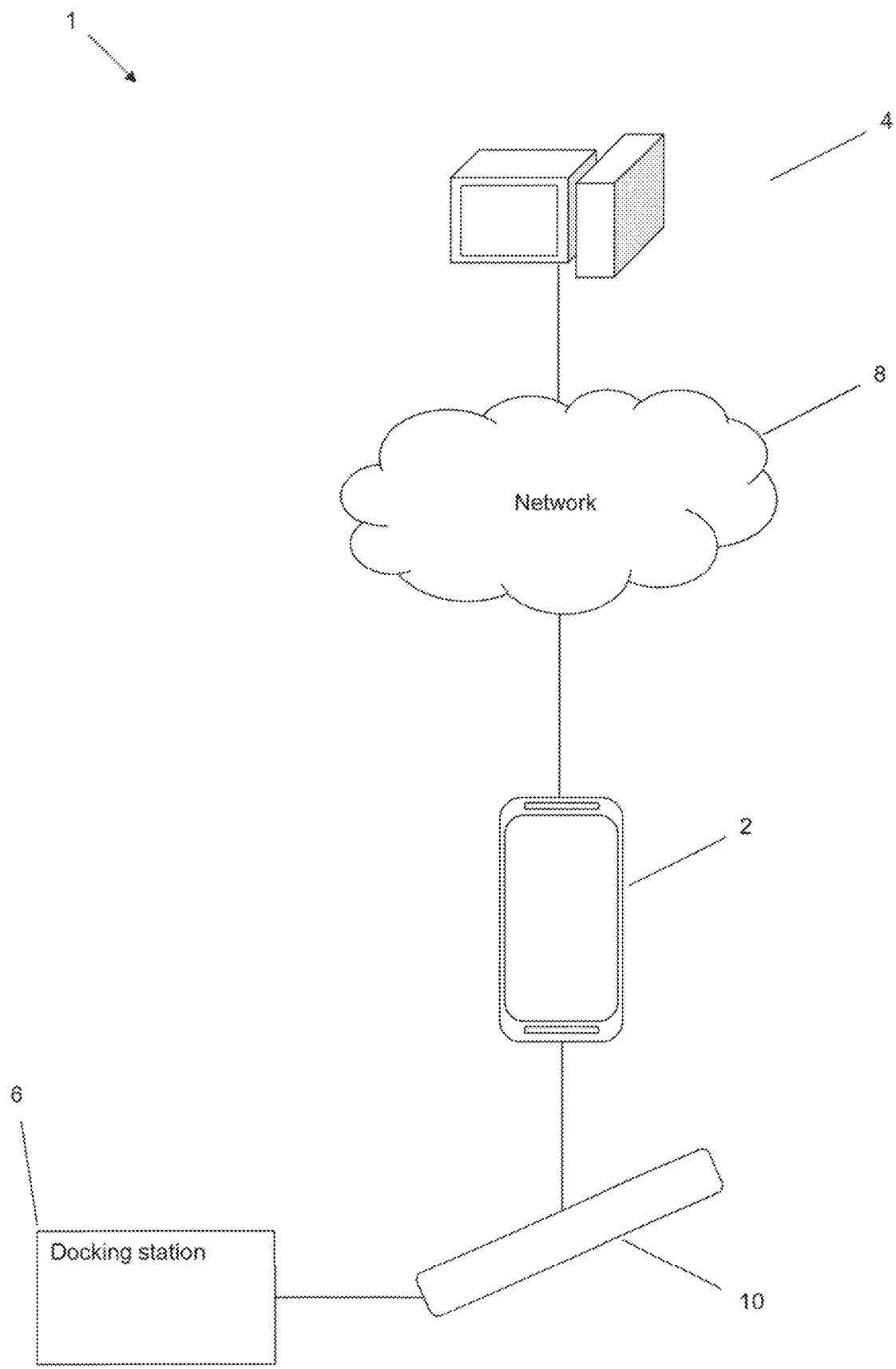
FIG. 1 shows an example system for managing a smoking substitute device.

At its broadest, the present disclosure is concerned with techniques associated with disabling a smoking substitute device, e.g. to prevent unauthorised use of the smoking substitute device.

Some aspects of the present disclosure are concerned with a smoking substitute device which is configured to function for a predetermined period after purchase, measured either by time or by a parameter relating to usage, and subsequently require an age verification test to be passed before the device will continue to function.

In a first non-limiting aspect, the present disclosure provides a smoking substitute device comprising: a control unit; and an interface configured to communicate with an external device; wherein the control unit is configured to, after a predetermined action is performed (e.g. by a user) using the smoking substitute device, disable the smoking substitute device when a predetermined criteria relating to usage of the smoking substitute device is met and/or a predetermined length of time has elapsed; and wherein the control unit is configured to enable the smoking substitute device when a signal indicating that an age verification test has been passed by a user of the smoking substitute device is received by the smoking substitute device via the interface.

Advantageously, as an age check is generally performed at the point of purchase, this allows the user of the smoking substitute device to use the smoking substitute device immediately after purchase whilst ensuring that an age verification test is performed at a predetermined point after purchase, e.g. before the smoking substitute device might be accessed by children or those who are not of the required age.

In certain non-limiting embodiments, the control unit is further configured to, after the user has performed the predetermined action using the smoking substitute device, avoid disabling the smoking substitute device when the predetermined criteria relating to usage of the smoking substitute device is met and/or the predetermined length of time has elapsed, if the signal indicating that an age verification test has been passed by a user of the smoking substitute device is received by the smoking substitute device (via the interface) before the predetermined criteria relating to usage of the smoking substitute device is met and/or the predetermined length of time has elapsed. In other words, the disabling of the smoking substitute device when the predetermined criteria relating to usage of the smoking substitute device is met and/or the predetermined length of time has elapsed desirably (but not by way of limitation) occurs only if a signal indicating that an age verification test has been passed by a user of the smoking substitute has not (yet) been received by the smoking substitute device at that time. To implement this functionality, the smoking substitute device may include (e.g. stored in memory) an indicator (e.g. flag) that records whether or not the smoking substitute device 10 has been informed that an age verification test has been passed.

The control unit of the smoking substitute device may be configured, in response to disabling the smoking substitute device, to transmit a signal to the external device either requesting that an age verification test be performed or indicating that the smoking substitute device is disabled pending a successful age verification test.

In response to receiving such a signal, the external device may prompt a user to perform an age verification test. This test could be performed on the mobile device, e.g. in the app or via a web interface. It would also be possible for the external device to prompt the user to perform an age verification elsewhere, e.g. on another device or in a store, e.g. by providing suitable directions to the user. Examples of possible age verification tests are discussed below.

Disabling the smoking substitute device may be taken to mean putting the smoking substitute device in a state in which it cannot be used to produce an aerosol vapour, unless/until the smoking substitute device is subsequently enabled.

Disabling the smoking substitute device may include disabling a heater of the smoking substitute device. Disabling the heater may include, for example, setting a maximum operating voltage of the heater to 0 V or prohibiting the provision of power to the heater from a battery of the smoking substitute device. The heater, in some examples, may be a coil within a coil and wick assembly. Other techniques for disabling the smoking substitute device would be apparent to a skilled person. For example, the control unit may be configured to disable the smoking substitute device by not sending signals to trigger the provision of electrical energy to the heater.

The interface may be a wireless interface, which is configured to communicate wireless with the external device, and the signal indicating that an age verification test has been passed by the user of the smoking substitute device may be received via the wireless interface. The interface may be a wired interface, for example a USB® interface, and the signal indicating that an age verification test has been passed by the user of the smoking substitute device may be received via the wired interface.

The predetermined action may be performed by a user, thus the control unit may be configured to, after the user has performed a predetermined action using the smoking substitute device, disable the smoking substitute device when a predetermined criteria relating to usage of the smoking substitute device is met and/or a predetermined length of time has elapsed.

The predetermined action may be a first activation of the smoking substitute device by the user, triggered e.g. by the user inhaling from the smoking substitute device. The predetermined action may be a first activation of the smoking substitute device, triggered e.g. by the user pressing an actuator on the smoking substitute device or by turning the smoking substitute device on. The predetermined action may be a first activation of the smoking substitute device, triggered by an entity associated with manufacture of the smoking substitute device (e.g. during a process for testing that the smoking substitute device is working properly that is performed by that entity). The predetermined action may be a first activation of the smoking substitute device, triggered e.g. by the user connecting the smoking substitute device to a charger. The predetermined action may be a first connection of the smoking substitute device to the external device. The predetermined action may be the removal of a tab from the smoking substitute device. The tab may, for example, electrically isolate a battery of the smoking substitute device from the remaining components of the smoking substitute device. Removal of the tab may allow the provision of electrical energy from the smoking substitute device to the consumable. Alternatively, the removal of the tab may cause the control unit to actively allow the provision of electrical energy from the smoking substitute device to the consumable e.g. through changing a software flag. The predetermined action may be a first connection of a consumable suitable for use with the smoking substitute device to the smoking substitute device. The predetermined action may be any combination of the previously disclosed predetermined actions.

The predetermined criteria relating to usage may be a number of activations of the smoking substitute device. The number of activations may be, for example, 50 or 100 activations. The predetermined criteria relating to usage may be a number of coil activations of the smoking substitute device, for example when the smoking substitute device includes a coil and wick heater assembly. The predetermined criteria relating to usage may be an accumulated time over which the smoking substitute device has been activated. The predetermined criteria relating to usage may be a number of power charging cycles of the smoking substitute device. The predetermined criteria relating to usage may be an amount of power consumed by the smoking substitute device. The predetermined criteria relating to usage may be any combination of the previously disclosed predetermined criteria.

The external device may be a mobile device. For example, the external device may be a smart phone, tablet, smart watch, or smart car.

The external device may be a remote server. For example, the remote server may be operated by the vendor of the smoking substitute device and with whom the user of the smoking substitute device may have an account.

The predetermined time may be 1 week or less. The predetermined time may be 48 hours or less. The predetermined time may be 24 hours or less.

In one example, the control unit may be configured to disable the smoking substitute device a predetermined time after the predetermined criteria relating to usage has been met. For example, 24 hours after the first N activations are complete, the control unit may disable the device until a signal indicating that an age verification test has been passed by the user of the smoking substitute device is received by the smoking substitute device.

The control unit maybe configured, after a previous age verification test has been passed by the user, to disable the smoking substitute device when a further predetermined criteria relating to usage of the smoking substitute device is met and/or a further predetermined length of time has elapsed since the previous age verification test, and to enable the smoking substitute device when a subsequent age verification test has been passed by the user.

Advantageously, this can ensure that a user of the smoking substitute device does not simply wait for the first age verification test to have occurred before selling or giving the smoking substitute device to a user who is not of the appropriate age.

The further predetermined criteria relating to usage may be a number of activations of the smoking substitute device which have occurred since the previous age verification test. The further predetermined criteria relating to usage may be a number of coil activations of the smoking substitute device which have occurred since the previous age verification test. The further predetermined criteria relating to usage may be an accumulated time over which the smoking substitute device has been activated since the previous age verification test. The further predetermined criteria relating to usage may be a number of power charging cycles of the smoking substitute device to have occurred since the previous age verification test. The further predetermined criteria relating to usage may be an amount of power consumed by the smoking substitute device since the previous age verification test. The further predetermined criteria relating to usage may be any combination of the previously disclosed further predetermined criteria.

The predetermined criteria relating to usage could be a deviation from a usage profile meeting a predetermined threshold. For example, the control unit and/or an external device (see below) may be configured to monitor the usage of the smoking substitute device, and derive a usage profile associated with the user of the smoking substitute device. The control unit and/or the external device (see below) may be configured to monitor for deviation from this usage profile, and in response (e.g. to the deviation meeting a predetermined threshold) disable the device, e.g. until an age verification test has been passed (e.g. when a signal indicating that an age verification test has been passed by a user of the smoking substitute device is received by the smoking substitute device via the interface).

The control unit may be configured to, when disabling the smoking substitute device when the predetermined criteria relating to usage of the smoking substitute device is met and/or the predetermined length of time has elapsed, disable the smoking substitute device pending successful performance of an age verification test, e.g. by setting one or more indicators (e.g. one or more flags) on the smoking substitute device (e.g. in a memory of the smoking substitute device) to indicate that the device is disabled pending successful performance of the age verification test. In certain non-limiting embodiments, disabling the smoking substitute device pending successful performance of an age verification test only occurs if an age verification test has not yet been passed by the user (as noted above, if such a test has been performed, this could be recorded in an indicator included in the smoking substitute device).

In a second non-limiting aspect, the present disclosure provides a system for managing a smoking substitute device, the system comprising: a smoking substitute device according to the first non-limiting aspect of the present disclosure; and an external device, configured to, when a user of the smoking substitute device has passed an age verification test, send a signal indicating that the age verification test has been passed by the user of the smoking substitute device via the interface of the smoking substitute device.

Advantageously, as an age check is generally performed at the point of purchase, the above described features may allow the user of the smoking substitute device to use the smoking substitute device for a certain amount of time immediately after purchase whilst ensuring that an age verification test is performed at a predetermined point after purchase, e.g. before the smoking substitute device might be accessed by children or those who are not of the required age.

The external device may be a mobile device, connectable to a remote server, and configured to connect to the smoking substitute device.

The external device may be a remote server, which is configured to connect to the smoking substitute device.

The external device may be configured to monitor the usage of the smoking substitute device, and derive a usage profile associated with the user of the smoking substitute device. The external device (see below) may be configured to monitor for deviation from this usage profile, and in response (e.g. to the deviation meeting a predetermined threshold) disable the device, e.g. until a signal indicating that an age verification test has been passed by a user of the smoking substitute device is received by the smoking substitute device via the interface. As noted above, such a signal may be sent by the external device.

The system may be configured to, in response to the smoking substitute device becoming disabled pending an age verification test, provide the user with the age verification test in which a determination is made as to whether the user has a predetermined age or higher.

Verifying that the user is of a predetermined age or higher may include: requesting and receiving information from the user indicative of the user's age; and crosschecking the requested information with an external database (which could e.g. be done by part of the remote server discussed below).

The information requested may include or be, for example, a date of birth.

The predetermined age may be 16, for example. The predetermined age may be 18, for example.

The user may open an application on their smartphone or other device to verify their age. This device may be connected, for example wirelessly, with the smoking substitute device and may send the signal to the smoking substitute device when the age of the user has been verified.

The age verification test could be provided via a web interface, for example, e.g. on the mobile device or on another computer. A user could register their smoking substitute device with a vendor account belonging to them as part of this age verification test, for example.

A person skilled in the art will appreciate that age verification tests are well known per se, and any of these tests may be implemented with the above described system and/or smoking substitute device. Some examples are discussed in more detail below.

The system of the second non-limiting aspect may include a remote server, and the remote server may be configured to disable the smoking substitute device if it is determined that a number of devices registered to a same user exceeds a threshold.

In a third non-limiting aspect, the present disclosure provides a system for managing a smoking substitute device, the system comprising: a smoking substitute device; and a remote server; wherein the remote server is configured to disable the smoking substitute device if it is determined that a number of devices registered to a same user exceeds a threshold.

Advantageously, this can help prevent a single user who is of the required age providing numerous smoking substitute devices to users who are not of the required age.

The system may disable the smoking substitute device by transmitting, from the external device, a signal indicating that the smoking substitute device should be disabled. This signal could be transmitted via an external device.

Thus, the system may comprise an external device, e.g. a mobile device, configured to communicate with the smoking substitute device. The remote server may disable the smoking substitute device by sending a signal to the external device indicating that the threshold has been exceeded, with the external device then, in response to receiving the signal from the remote server, sending a disable signal to the smoking substitute device, wherein the disable signal is configured to disable the smoking substitute device (this disable signal could be an unconditional disable signal as discussed below).

The smoking substitute device of the system of the third non-limiting aspect may be the smoking substitute device of the first non-limiting aspect.

The system of the third non-limiting aspect may be implemented on the system of the second non-limiting aspect and/or fourth non-limiting aspect, and vice versa.

In a fourth non-limiting aspect, the present disclosure provides a system for managing a smoking substitute device, the system comprising: a smoking substitute device; and an external device configured to send one or more disable signals to the smoking substitute device, wherein the/each disable signal is respectively one of: an unconditional disable signal configured to disable the smoking substitute device; or a conditional disable signal configured to activate a conditional disable function on the smoking substitute device, wherein the conditional disable function is configured to disable the smoking substitute device if a predetermined criteria is met.

In this way, an external device can be used to control when and/or in what circumstances the smoking substitute device is disabled, e.g. so as to prevent unauthorised use of the smoking substitute device.

The smoking substitute device may include a control unit, e.g. to control operation of the smoking substitute device.

The control unit may be configured to: disable the smoking substitute device, in response to the smoking substitute device receiving an unconditional disable signal from the external device; and/or activate a conditional disable function on the smoking substitute device, in response to the smoking substitute device receiving a conditional disable signal from the external device.

The smoking substitute device may include an interface configured to communicate with the external device.

The external device may be a mobile device, e.g. a mobile phone.

The interface may be a wireless interface configured to communicate wirelessly with (e.g. a corresponding wireless interface on) the external device (e.g. mobile device), e.g. so as to establish a wireless connection between the smoking substitute device and the external device, e.g. a Bluetooth connection, e.g. a Bluetooth low energy connection.

An application (e.g. app) may be installed on the external device (e.g. mobile device).

The ability to send an unconditional disable signal from the mobile device to the smoking substitute device may be viewed as a manual lock function.

A variety of possible conditional disable functions have been envisaged by the present inventors, and the ability to activate one or more of these functions may provide a user with a high level of configurability to secure their device, whilst minimising inconvenience.

An example conditional disable function is a proximity lock function, wherein the proximity lock function is configured to, when activated on the smoking substitute device, disable the smoking substitute device if a wireless connection (e.g. a Bluetooth connection) between the smoking substitute device and the external device is absent(/lost) for more than a predetermined period of time. The predetermined period of time may be a value that can be changed by a user, e.g. via the application. Alternatively, the predetermined period of time may be a fixed value that cannot be changed by a user. For avoidance of any doubt, the predetermined period of time may be zero (i.e. such that when the proximity lock function is enabled, the smoking substitute device is disabled as soon as a wireless connection between the smoking substitute device and the external device is lost). A proximity lock may be useful in stopping unauthorised users from using the smoking substitute device, e.g. when it is out of sight of the primary user of the smoking substitute device.

Another example conditional disable function is a time lock function, wherein the time lock function is configured to, when activated on the smoking substitute device, disable the smoking substitute device if the smoking substitute device is not activated (i.e. used by the user) for more than a predetermined period of time. The predetermined period of time may be a value that can be changed by a user, e.g. via the application. Alternatively, the predetermined period of time may be a fixed value that cannot be changed by a user. For avoidance of any doubt, the predetermined period of time may be zero, although this is not ideal, as it could be inconvenient for a user. A time lock may be useful in stopping unauthorised users from using the smoking substitute device, e.g. when it is out of sight of the primary user of the smoking substitute device.

Another example conditional disable function is a gesture lock function, wherein the gesture lock function is configured to, when activated on the smoking substitute device, disable the smoking substitute device if the user performs a predetermined gesture with the smoking substitute device. In this case, in certain non-limiting embodiments, the smoking substitute device includes one or more movement detection devices (e.g. accelerometers) to detect a gesture performed by a user with the smoking substitute device. Further, the control unit may be configured to determine, based on an output of the one or more movement detection devices, whether the predetermined gesture has been performed with the smoking substitute device. Gesture detection is known in other contexts. The predetermined gesture could be set by a user, e.g. via the application. For example, the application may be configured to initiate recording of a gesture performed by the user with the smoking substitute device, with the recorded gesture then being set as the predetermined gesture. The predetermined gesture could be predefined e.g. by a manufacturer of the device. There may be more than one predetermined gesture. A gesture lock may be useful in allowing a user of the device to stop unauthorised users from using the smoking substitute device, e.g. when the device is likely to be out of sight of the primary user of the smoking substitute device.

Another example conditional disable function is a geographic lock function, wherein the geographic lock function is configured to, when activated on the smoking substitute device, disable the smoking substitute device if the smoking substitute device and/or a mobile device with a wireless connection (e.g. a short range wireless connection, e.g. via Bluetooth) with the smoking substitute device is determined to have a geographical location that is within one or more predetermined geographical areas. In this case, in certain non-limiting embodiments, the smoking substitute device and/or the mobile device include a geographical detection device (e.g. a GPS unit) to detect a geographic location of the smoking substitute device and/or the mobile device. For avoidance of any doubt, the geographical location of the smoking substitute device could be determined by inference from a geographical location of the mobile device determined using a geographical detection device (e.g. GPS unit) included in the mobile device. Also for the avoidance of any doubt, the mobile device with the wireless connection with the smoking substitute device could be the external device referred to above. The one or more predetermined geographical areas could be set by a user, e.g. via the application. For example, the application could have a map interface through which the one or more predetermined geographical areas could be set by the user, e.g. by the user selecting (e.g. through a touch screen interface) one or more geographical areas in which the smoking substitute device should be disabled and/or by the user selecting (e.g. through a touch screen interface) one or more geographical areas in which the smoking device should not be disabled (note that it may be possible to negatively define the one or more predetermined geographical areas). As another example, the user could set a home location with a predetermined geographical area then being defined as a geographical area within a predetermined distance of the home location. The predetermined distance may be a value that can be changed by a user, e.g. via the application. A geographic lock may be useful in stopping unauthorised users from using the smoking substitute device, e.g. at home when children might more easily have access to the smoking substitute device compared with when the smoking substitute device is taken away from home.

Another example conditional disable function is an age lock function, wherein the age lock function is configured to, when activated on the smoking substitute device, disable the smoking substitute device if more than a predetermined period of time has elapsed since an age verification test has successfully been passed by a user of the smoking substitute device. The predetermined period of time may be a value that can be changed by a user, e.g. via the application. Age verification tests are discussed in detail elsewhere in this disclosure. An age lock may be useful in allowing a user of the device to stop unauthorised users from using the smoking substitute device, e.g. when it is out of sight of the primary user of the smoking substitute device.

It is to be noted that the proximity lock function, time lock function, gesture lock function, geographic lock function (where the smoking substitute device includes a geographical detection device), and age lock function described above can be implemented such that the smoking substitute device is able to disable itself when the relevant criteria are met, even when the smoking substitute device does not have a wireless connection to the external device (e.g. mobile device). In this way, unauthorised use of the device can be avoided or minimised should the smoking substitute device become misplaced, lost or stolen. Such features may help deter potential thieves from stealing the device, or may prevent children or other unauthorised users from using the device should it become misplaced/lost.

The application may be configured to provide a user interface on (e.g. a display screen of) the external device, wherein the user interface provides a user with one or more disable settings that can be changed by the user. The mobile device (e.g. application installed on the mobile device) may be configured to trigger the external device into sending the/each disable signal, in response to the user changing the/each disable setting via the user interface.

The system of the fourth non-limiting aspect may include a remote server.

The external device may be configured to send to the remote server one or more of the disable settings as set by the user at the external device. In this way, the remote server can store one or more disable settings associated with the user which can be pushed out to a new smoking substitute device later acquired by the user, without the user having to re-enter their chosen settings.

In any of the above aspects of the present disclosure, the smoking substitute device and/or external device (if present) may be configured to, after the smoking substitute device has been disabled, enable the smoking substitute device (e.g. to allow the smoking substitute device to produce an aerosol vapour) in response to a predetermined action performed using the smoking substitute device and/or the external device.

This may provide a user with the ability to straightforwardly re-enable their device in the above manner after it has become disabled, e.g. so the user is not faced with an unduly bothersome procedure to start using their device again when it has become disabled, e.g. because an unconditional disable signal has been received at the smoking substitute device or because a conditional disable function activated on the smoking substitute device has caused the device to become disabled.

The predetermined action (performed using the smoking substitute device and/or the external device) to enable the smoking substitute device may include, for example: performing a predetermined action at the smoking substitute device; and/or a user instructing the enabling of the smoking substitute device via a user interface provided by the external device (e.g. on a display screen of a mobile device, if the external device is a mobile device).

The predetermined action performed at the smoking substitute device could, for example, be a predetermined gesture performed with the smoking substitute device (which could be detected, for example, using one or more movement detection devices included in the smoking substitute device).

The predetermined action performed using the smoking substitute device and/or the external device (if present) can be viewed as a verification process for showing the user is authorised to use the device, since non-users of the device (e.g. children) might not know of the predetermined action used to unlock the device.

In general, it is useful to provide a user with the ability to straightforwardly re-enable their device in the above manner. However, this might not always be the case since, for example, it may be desirable to prevent a user from straightforwardly enabling their device in this manner when it is desired to force a user to complete an additional verification process for showing the user is authorised to use the device, e.g. as with the first non-limiting aspect of the present disclosure, where it may be desirable to force an age verification test to be completed before the device is enabled.

Thus, the smoking substitute device and/or external device (if present) may be configured to, after the smoking substitute device has been disabled, enable the smoking substitute device (e.g. to allow the smoking substitute device to produce an aerosol vapour) in response to the predetermined action performed using the smoking substitute device and/or the external device, unless the smoking substitute device has been disabled pending successful performance of a further verification process for showing the user is authorised to use the device.

Here, the term "further" is used simply to distinguish the further verification process from the predetermined action performed using the smoking substitute device and/or the external device, since, as noted above, the performance of that predetermined action can itself be viewed as a verification process for showing the user is authorised to use the device.

The further verification process may be an age verification test, e.g. as described in connection with the first non-limiting aspect of the present disclosure.

The smoking substitute device could be disabled pending successful performance of an additional verification process, e.g. by setting one or more indicators (e.g. one or more flags) on the smoking substitute device to indicate that the device is disabled pending successful performance of the additional verification process. In the absence of the one or more indicators being set in this way, the smoking substitute device and/or external device (if present) may be configured to enable the smoking substitute device in response to the predetermined action being performed.

For example, in the first non-limiting aspect of the present disclosure, an indicator (e.g. flag) indicating that the smoking substitute device is disabled pending successful performance of an age verification test could be set on the smoking substitute device, when the control unit of the smoking substitute device disables the smoking substitute device in the circumstances described in the first non-limiting aspect of the present disclosure (i.e. when the predetermined criteria relating to usage of the smoking substitute device is met and/or the predetermined length of time has elapsed, after the predetermined action is performed using the smoking substitute device). In this way, a user would not be able to bypass the age verification test simply by performing the predetermined action in these circumstances, but would instead need to successfully complete an age verification test before their device can be enabled.

As another example, in the fourth non-limiting aspect of the present disclosure, a flag indicating that the smoking substitute device is disabled pending successful performance of a further verification process would desirably not be set, when a proximity lock function disables the smoking substitute device. In this way, a user could more readily enable their device after their device has been locked by the proximity lock function.

As another example, in the fourth non-limiting aspect of the present disclosure, a flag indicating that the smoking substitute device is disabled pending successful performance of a further verification process would desirably not be set, when a time lock function disables the smoking substitute device. In this way, a user could more readily enable their device after their device has been locked by the time lock function.

As another example, in the fourth non-limiting aspect of the present disclosure, a flag indicating that the smoking substitute device is disabled pending successful performance of a further verification process would desirably not be set, when a gesture lock function disables the smoking substitute device. In this way, a user could more readily enable their device after their device has been locked by the gesture lock function.

As another example, in the fourth non-limiting aspect of the present disclosure, a flag indicating that the smoking substitute device is disabled pending successful performance of a further verification process would desirably not be set, when a geographic lock function disables the smoking substitute device. In this way, a user could more readily enable their device after their device has been locked by the geographic lock function.

As another example, in the fourth non-limiting aspect of the present disclosure, a flag indicating that the smoking substitute device is disabled pending successful performance of an age verification test may be set, when an age lock function disables the smoking substitute device. In this way, the forced age verification test(s) could not easily be bypassed.

The system of the fourth non-limiting aspect may be implemented on the system of the second non-limiting aspect and/or third non-limiting aspect, and vice versa.

In a fifth non-limiting aspect, the present disclosure provides a smoking substitute device, wherein the smoking substitute device is configured to, after the smoking substitute device has been disabled, enable the smoking substitute device (e.g. to allow the smoking substitute device to produce an aerosol vapour) in response to the predetermined action performed using the smoking substitute device, unless the smoking substitute device has been disabled pending successful performance of a further verification process for showing the user is authorised to use the device.

The fifth non-limiting aspect of the present disclosure may alternatively provide a system including a smoking substitute device and an external device, wherein the smoking substitute device and/or external device is configured to, after the smoking substitute device has been disabled, enable the smoking substitute device (e.g. to allow the smoking substitute device to produce an aerosol vapour) in response to the predetermined action performed using the smoking substitute device and/or the external device, unless the smoking substitute device has been disabled pending successful performance of a further verification process for showing the user is authorised to use the device.

The smoking substitute device and/or system according to the fifth non-limiting aspect of the present disclosure may include any one or more features as described above in any one or more other aspects of the present disclosure.

The smoking substitute device and/or system according to the fifth non-limiting aspect of the present disclosure may be a device and/or system as described above in another non-limiting aspect of the present disclosure, but is not limited to such devices or systems. For example, the smoking substitute device according to the fifth non-limiting aspect of the present disclosure could potentially be disabled via another route, e.g. if the smoking substitute device were to determine that a main body of the smoking substitute device is physically coupled to a consumable that is not valid for use with the main body, see e.g. co-pending patent application GB1803033.8 and derivatives thereof, the content of which is incorporated by reference herein.

The present disclosure includes any combination of the features and aspects described above and herein, except where this is expressly forbidden.

Aspects and embodiments of the present disclosure will now be discussed with reference to the accompanying figures. Further aspects and embodiments will be apparent to those skilled in the art. All documents mentioned in this text are incorporated herein by reference FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g. via Bluetooth™, with an application (or "app") installed on the mobile device 2, e.g. via a suitable wireless interface (not shown) on the mobile device 2. The mobile device 2 might include one or more movement detection devices (e.g. accelerometers) to detect a gesture performed by a user with the mobile device 2. The mobile device 2 might have a geographical detection device, e.g. GPS unit (not shown), to detect a geographic location of the mobile device 2. Such features are common in mobile phones, for example.

The mobile device 2 may be a mobile phone, for example. The application on the mobile phone is configured to communicate with the application server 6, via a network 8. The application server 6 may utilise cloud storage, for example.

The network 8 may include a cellular network and/or the internet.

A skilled person would readily appreciate that the mobile device 2 may be configured to communicate via the network 8 according to various communication channels, such as (but not limited to) a wireless communication channel such as via a cellular network (e.g. according to a standard protocol, such as 3G or 4G) or via a WiFi network.

The charging station 6 (if present) may be configured to charge (and optionally communicate with) the smoking substitute device 10, via a charging port on the smoking substitute device 10.

FIG. 2(a) shows an example smoking substitute device 110. In this example, the smoking substitute device 110 includes a main body 120 and a consumable 150. The consumable 150 may alternatively be referred to as a "pod."

In this example, the smoking substitute device 110 is a closed system vaping device, wherein the consumable 150 includes a sealed tank 156 and is intended for one-use only.

FIG. 2(a) shows the smoking substitute device 110 with the main body 120 physically coupled to the consumable 150.

FIG. 2(b) shows the main body 120 of the smoking substitute device 110 without the consumable 150.

FIG. 2(c) shows the consumable 150 of the smoking substitute device 110 without the main body 120.

The main body 120 and the consumable 150 are configured to be physically coupled together, in this example by pushing the consumable 150 into an aperture in a top end 122 of the main body 120. In other examples, the main body 120 and the consumable could be physically coupled together by screwing one onto the other, or through a bayonet fitting, for example. An optional light 126, e.g. an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

In certain non-limiting embodiments, the tank 156 includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

The tank 156 may be referred to as a "clearomizer" if it includes a window 158, or a "cartomizer" if it does not.

The consumable 150 may identify itself to the main body 120, via an electrical interface, RFID chip, or barcode, for example.

Figure 3A:
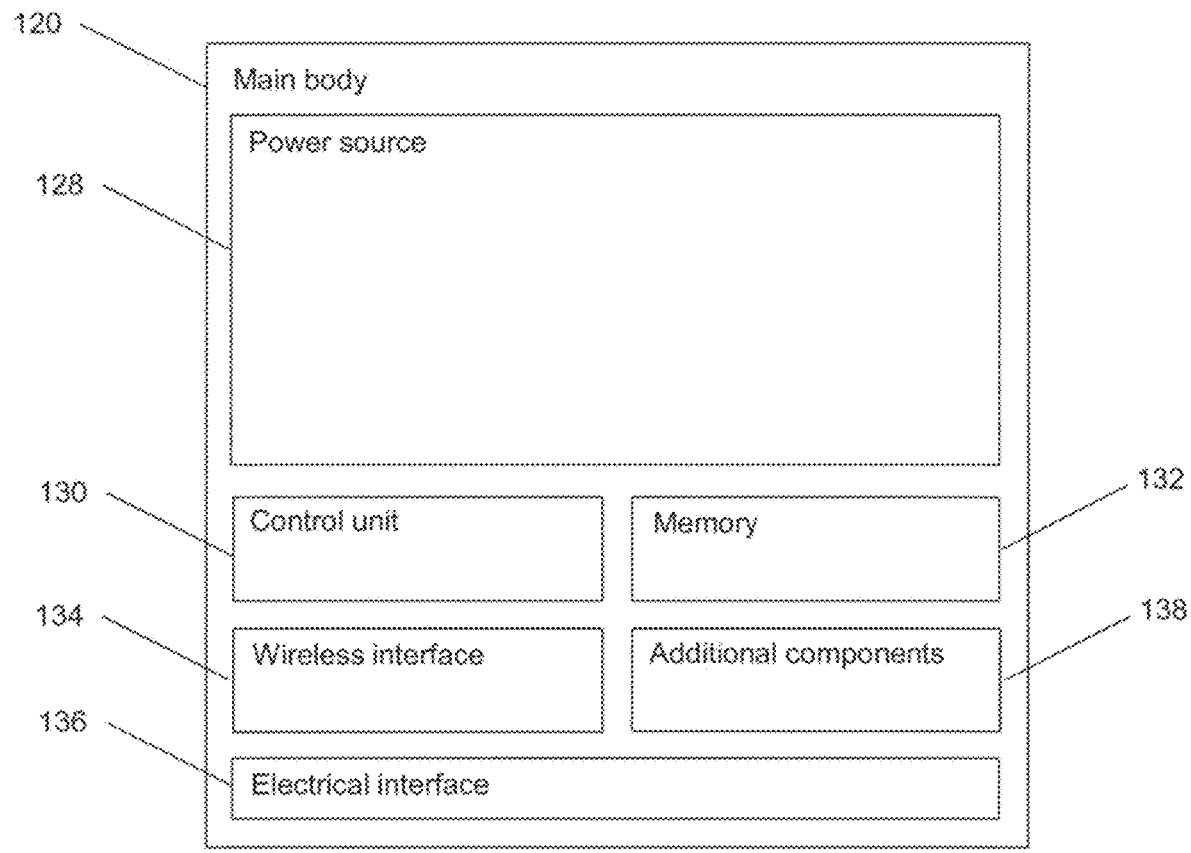
FIG. 3(a) is a schematic view of the main body of the smoking substitute device of FIG. 2(a).

FIG. 3(a) is a schematic view of the main body 120 of the smoking substitute device 110.

Figure 3B:
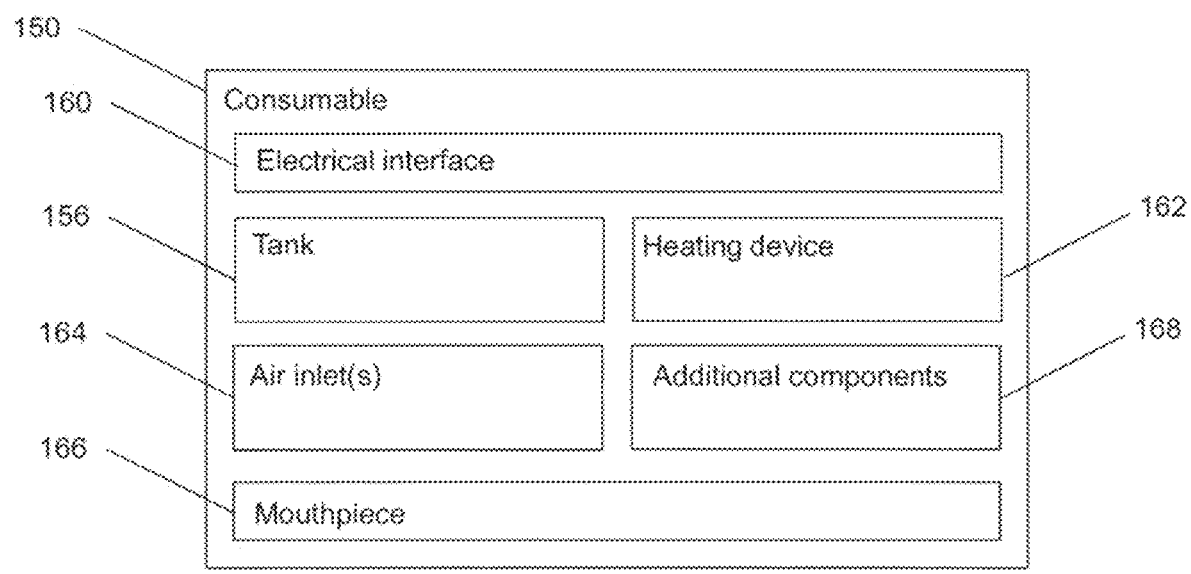
FIG. 3(b) is a schematic view of the consumable of the smoking substitute device of FIG. 2(b).

FIG. 3(b) is a schematic view of the consumable 150 of the smoking substitute device 110.

As shown in FIG. 3(a), the main body 120 includes a power source 140, a control unit 130, a memory 132, a wireless interface 134, an electrical interface 136, and, optionally, one or more additional components 138.

In certain non-limiting embodiments, the power source 140 is a battery, such as (but not limited to) a rechargeable battery.

The control unit 130 may include a microprocessor, for example.

In certain non-limiting embodiments, the memory 132 includes non-volatile memory. The memory may include instructions which, when implemented, cause the control unit 130 to perform certain tasks or steps of a method.

In certain non-limiting embodiments, the wireless interface 134 is configured to communicate wirelessly with the mobile device 2, e.g. so as to establish a wireless connection between the smoking substitute device and the external device, e.g. via Bluetooth®. To this end, the wireless interface 134 could include a Bluetooth® antenna. Other wireless communication interfaces, e.g. WiFi®, are also possible. As discussed above, the wireless interface 134 may be configured to communicate wirelessly with the remote server 2.

The electrical interface 136 of the main body 120 may include one or more electrical contacts. The electrical interface 136 may be located in, and in certain non-limiting embodiments at the bottom of, the aperture in the top end 122 of the main body 120. When the main body 120 is physically coupled to the consumable 150, the electrical interface 136 may be configured to pass electrical power from the power source 140 to (e.g. a heating device of) the consumable 150 when the smoking substitute device 110 is activated, e.g. via the electrical interface 160 of the consumable 150 (discussed below). When the main body 120 is not physically coupled to the consumable 150, the electrical interface may be configured to receive power from the charging station 6. The electrical interface 136 may also be used to identify the consumable 150 from a list of known consumables. For example, the consumable may be a particular flavour and/or have a certain concentration of nicotine. This can be identified to the control unit 130 of the main body 120 when the consumable is connected to the main body. Additionally, or alternatively, there may be a separate communication interface provided in the main body 120 and a corresponding communication interface in the consumable 150 such that, when connected, the consumable can identify itself to the main body 120.

The additional components 138 of the main body 120 may include the optional light 126 discussed above.

The additional components 138 of the main body 120 may, if the power source 140 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 140 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g. caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less desirable where the consumable 150 is intended to be disposed of after use, as in this example). The airflow sensor can be used to determine, for example, how heavily a user draws on the mouthpiece or how many times a user draws on the mouthpiece in a particular time period.

The additional components 138 of the main body 120 may include an actuator, e.g. a button. The smoking substitute device 110 may be configured to be activated when the actuator is actuated. This provides an alternative to the airflow sensor noted, as a mechanism for activating the smoking substitute device 110.

The additional components 138 of the main body 120 may include one or more movement detection devices (e.g. accelerometers) to detect a gesture performed by a user with the smoking substitute device.

The additional components 138 of the main body 120 may include a geographical detection device (e.g. a GPS unit) to detect a geographic location of the smoking substitute device.

As shown in FIG. 3(*b*), the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. In certain non-limiting embodiments, the electrical interface 136 of the main body 120 and an electrical interface 160 of the consumable 150 are configured to contact each other and therefore electrically couple the main body 120 to the consumable 150 when the main body 120 is physically coupled to the consumable 150. In this way, electrical energy (e.g. in the form of an electrical current) is able to be supplied from the power source 140 in the main body 120 to the heating device 162 in the consumable 150.

In certain non-limiting embodiments, the heating device 162 is configured to heat e-liquid contained in the tank 156, e.g. using electrical energy supplied from the power source 140. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

In certain non-limiting embodiments, the one or more air inlets 164 are configured to allow air to be drawn into the smoking substitute device 110, when a user inhales through the mouthpiece 166.

In use, a user activates the smoking substitute device 110, e.g. through actuating an actuator included in the main body 120 or by inhaling through the mouthpiece 166 as described above. Upon activation, the control unit 130 may supply electrical energy from the power source 140 to the heating device 162 (via electrical interfaces 136, 166), which may cause the heating device 162 to heat e-liquid drawn from the tank 156 to produce a vapour which is inhaled by a user through the mouthpiece 166.

As an example of one of the one or more additional components 168, an interface for obtaining an identifier of the consumable may be provided. As discussed above, this interface may be, for example, an RFID reader, a barcode or QR code reader, or an electronic interface which is able to identify the consumable to the main body. The consumable may, therefore include any one or more of an RFID chip, a barcode or QR code, or memory within which is an identifier and which can be interrogated via the electronic interface in the main body.

Of course, a skilled reader would readily appreciate that the smoking substitute device 110 shown in FIGS. 2(*a*), 2(*b*), and 2(*c*) and FIGS. 3(*a*) and 3(*b*) shows just one example implementation of a smoking substitute device, and that other forms of smoking substitute device could be used.

By way of example, a HNB smoking substitute device including a main body and a consumable could be used, instead of the smoking substitute device 110. One such HNB smoking substitute device is the IQOS® smoking substitute device discussed above.

As another example, an open system vaping device which includes a main body, a refillable tank, and a mouthpiece could be used, instead of the smoking substitute device 110. One such open system vaping device is the blu PRO™ e-cigarette discussed above.

As another example, an entirely disposable (one use) smoking substitute device could be used as the smoking substitute device.

Figure 4:
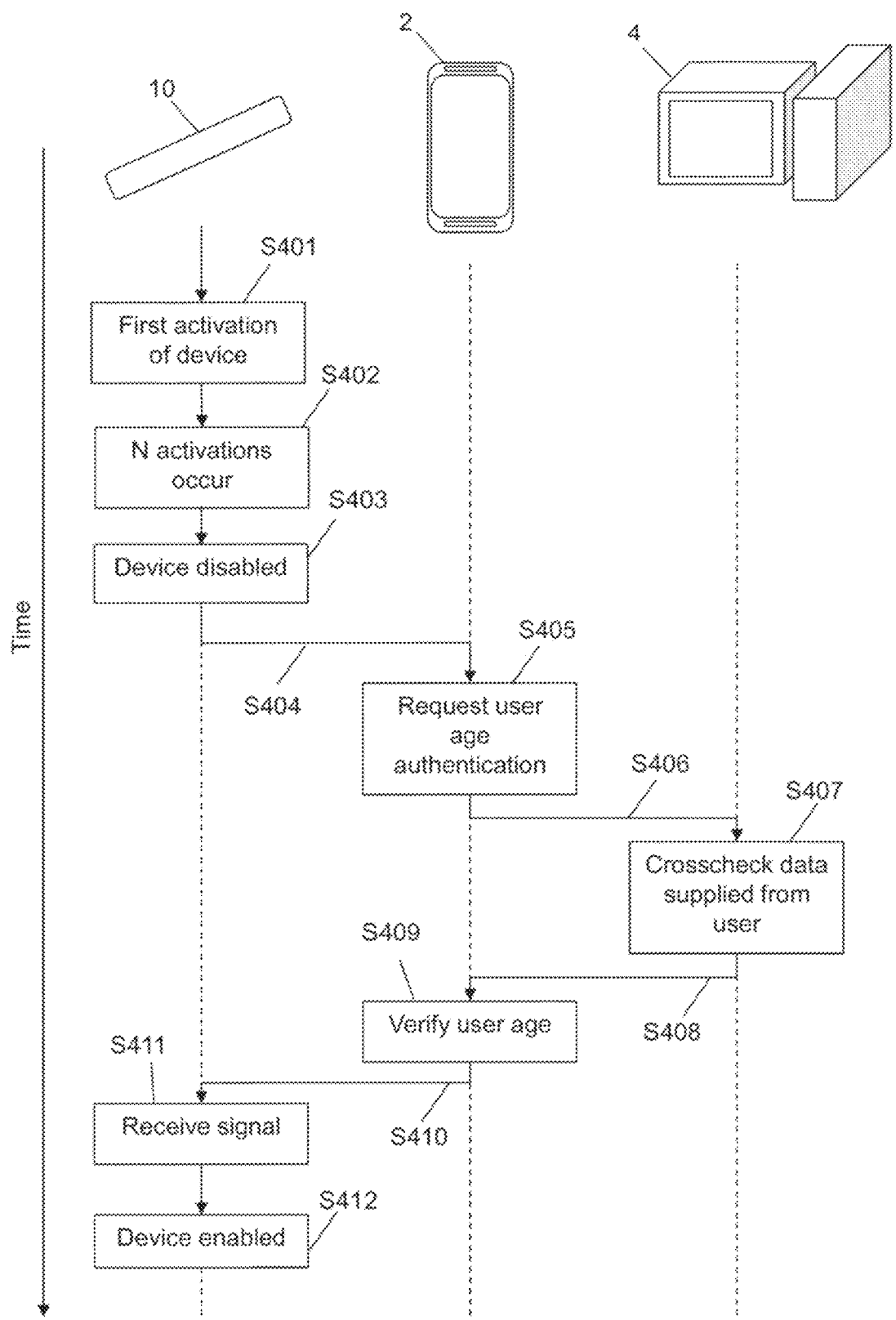
FIG. 4 is a network flow diagram illustrating the present disclosure.

FIG. 4 is a network flow diagram illustrating an embodiment of the present disclosure. In the diagram, time is along the vertical axis.

In a first step, S401, the smoking substitute device 10 is activated for a first time, e.g. by a user or by an entity associated with manufacture of the smoking substitute device 10 (e.g. during a process for testing that the smoking substitute device 10 is working properly that is performed by that entity). As has been discussed previously, activation may be through any one or more of plural mechanisms. For example, activation may be achieved by removal of a tab, or by a user or a testing machine drawing air through the device (e.g. inhaling by the user).

In a subsequent step, S402, a predetermined criteria relating to usage, in this example a number N of activations, is met. The predetermined criteria can be any one or more of the previously identified predetermined criteria. Moreover, whilst not illustrated in this diagram, additionally or alternatively a predetermined time period may have elapsed. Said another way, the step S402 may include or be replaced by a predetermined time period having elapsed.

Next (i.e. subsequent to step S402), in step S403, the smoking substitute device 10 is disabled by the control unit 130. In certain non-limiting embodiments, the device is disabled by the control unit 130 pending successful performance of an age verification test, e.g. by setting one or more indicators (e.g. one or more flags) on the smoking substitute device 10 to indicate that the device is disabled pending successful performance of the age verification test.

As mentioned previously, to disable the device a control unit may, for example, prohibit the provision of electrical energy to the heater 162. As will be appreciated by the skilled person disabling of the device by prohibition of the provision of electrical energy to the heater 162 may be implemented in various ways, for example a register value in memory of the smoking substitute device indicating the maximum voltage which may be provided to the heater may be set to 0 V. Other ways of disabling the device could be envisaged by a skilled person.

After the device 10 has been disabled by the control unit 130, a signal may be sent (in step S404), to a mobile device 2. The signal either indicates that the smoking substitute device has been disabled pending a successful age verification test, or requests that an age verification test be performed.

In response to receiving said signal, the mobile device 2, as shown in step S405, requests that the user verify their age. For example, an application running on mobile device 2 may request that the user enter their date of birth, payment card information (e.g. a debit or credit card), and/or vendor account information (e.g. username and password). The vendor account information may uniquely identify the user and be associated with a vendor account belonging to the user. The user could register their smoking substitute device 10 with their vendor account as part of or prior to the age verification test.

In this example, the mobile device 2 then transfers information provided by the user, in step S406, to a remote server 4. The remote server 4 then crosschecks the data provided by the user in step S407. In examples where the data is vendor account information, the remote server 4 may verify that a date of birth associated with the account indicates the user to be of the required age. If the data supplied by the user crosschecks successfully, the remote server 4 transmits, in step S408, a signal indicating this to the mobile device 2.

Various processes for performing an age verification test at the mobile device 2, which could e.g. be a mobile phone, could be envisaged by a skilled person. Some example processes for use in performing an age verification test will now be described.

In a first example process, the app installed on the mobile device may first ask the user to enter some information identifying the user, such as a name, address, date of birth (optionally a socially security number). The information may be processed by a trusted third party and not shared with others (the app may inform the user of this). Next, the user may be asked by the app installed on the mobile device 2 to provide at least one image of a photo ID card (such as (but not limited to) a front face and a reverse face of the photo ID card), e.g. using a camera on the mobile device 2. Once the image(s) have been provided, machine learning may be used (e.g. by the remote server 4) to ensure the photo ID card is genuine, not counterfeit. Next, the user may be asked to position their face in relation to a camera of the mobile device 2 (such as (but not limited to) a rear facing camera of the mobile device 2) so that their face appears on a screen of the mobile device 2. Image data of the user's face from this camera (e.g. video data) may be used to check the "liveness" of the user and/or to check that the user's face as viewed by this camera corresponds to a photo of the user on the photo ID card. This may help to safeguard the accuracy of the age verification test.

Figure 5A:
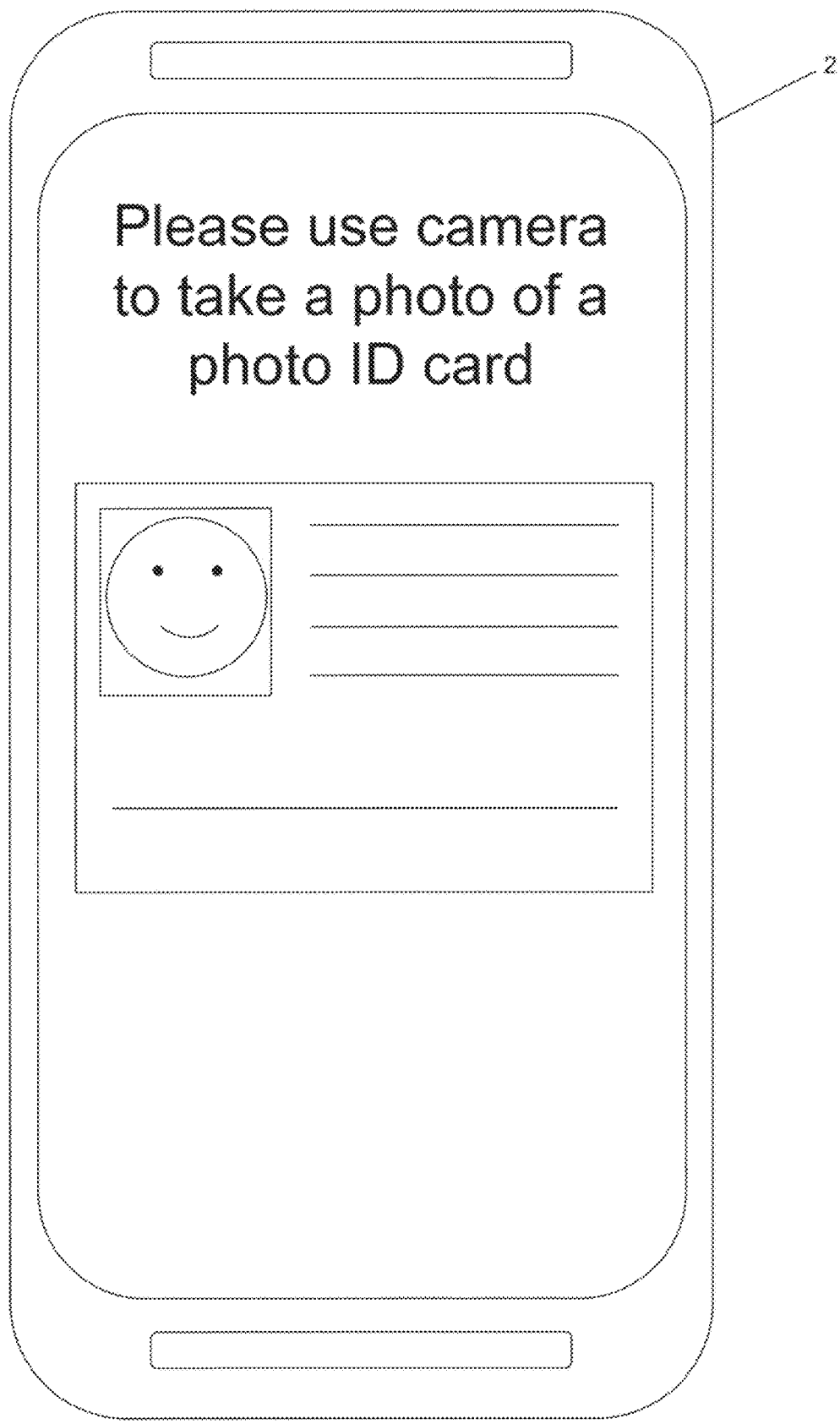
FIG. 5(a) shows a user interface on a mobile device which forms part of a process for performing an age verification test at the mobile device.
Figure 5B:
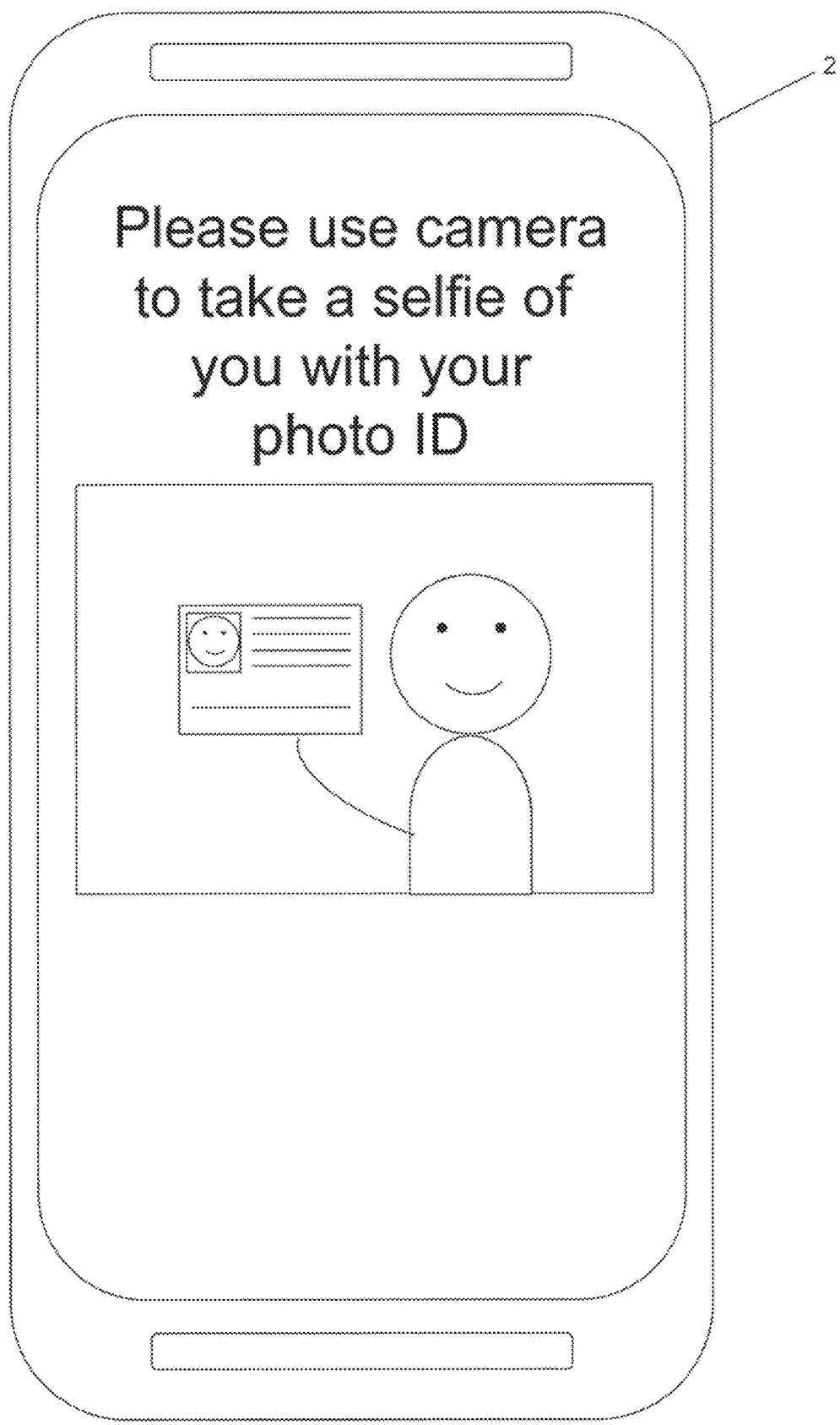
FIG. 5(b) shows another user interface on a mobile device which forms part of the process for performing an age verification test at the mobile device illustrated by FIG. 5(a).

FIGS. 5(*a*) and 5(*b*) illustrate a second example process for use in performing an age verification test at the mobile device 2, which could e.g. be a mobile phone. Firstly, as shown in FIG. 5(*a*), the user is asked by the app installed on the mobile device 2 to provide a photo of a photo ID card, e.g. using a front facing camera on the mobile device 2. Next, as shown in FIG. 5(*b*), the user is asked by the app to provide a photo of themselves holding their photo ID card, e.g. using a rear-facing camera on the mobile device 2. FIGS. 5(*a*) and 5(*b*) show the relevant camera view (front facing for FIG. 5(*a*) and rear-facing for FIG. 5(*b*)) in a box within the application, to make the photo taking process easier. The information provided by the user (in this case two photos) can then be crosschecked at or by the remote server 4. This process may involve a human analyst at the remote server 4, but may be partially or entirely automated (e.g. using optical character recognition and/or face recognition technologies).

In a third example process for use in performing an age verification test at the mobile device 2, which could e.g. be a mobile phone, the age verification test is performed via a video call between the user and a remote analyst, e.g. with the user showing the analyst a photo ID card during the video call. The video call could e.g. be performed using a camera (e.g. a rear-facing camera) of the mobile device 2. Information provided by the user during the video call could be crosschecked at or by the remote server 4, e.g. based on information entered by the analyst as a result of the video call.

The first, second and third processes described above (or elements thereof) may be combined with each other to provide further example processes for use in performing an age verification test.

As an alternative to steps S406-S408, the mobile device 2 may internally verify the data provided by the user, and proceed directly to step S409.

In some embodiments, the age verification test could be performed on another device, e.g. via a web portal in which the user enters information identifying the smoking substitute device 10.

In step S409, the mobile device 2 verifies that the user's age matches or exceeds a threshold age, e.g. based on the signal transmitted by the remote server 4 in step S408. This threshold age may be set by software on the mobile device 2, or by software on the remote server 4, in accordance with local law as applicable to the user.

In step S410, the mobile device transmits a signal, which could be referred to as an enable signal, indicating that the age verification test has been passed by the user to the smoking substitute device. The smoking substitute device receives this signal in step S411, which causes the control unit to enable the smoking substitute device in step S412, such as (but not limited to) whilst also changing the indicator on the smoking substitute device to no longer indicate that the device is disabled pending successful performance of an age verification test.

As will be appreciated, steps S401-S404 and S411 and S412 may be performed by the control unit 130 of the smoking substitute device. Steps S405-S410 may be performed entirely the mobile device 2, entirely by remote server 4, or by a combination of the mobile device 2 and the remote server 4.

In some embodiments, an age verification test could be performed by an authorised agent at the point of purchase. For example, as mentioned previously, an age check is generally performed by a salesperson at the point of purchase, as a part of the sales transaction (e.g. by the salesperson inspecting a photo ID belonging to the purchaser of the device). If the salesperson completes this age check and is authorised to do so, then the sales person could additionally confirm (e.g. via a web interface) to the remote server 4, which then confirms to the mobile device 2, which then confirms to the smoking substitute device 10, that an age verification test has been passed by the new user of the smoking substitute device 10. In this case, the signal indicating that an age verification test has been passed by a user of the smoking substitute device 10 could be received by the smoking substitute device 10 before the predetermined criteria relating to usage is met and/or the predetermined length of time has elapsed. In these circumstances, in certain non-limiting embodiments, the control unit 130 is configured to avoid disabling the smoking substitute device 10, since the signal indicating that an age verification test has been passed by a user of the smoking substitute device 10 has already been received by the smoking substitute device 10 before the predetermined criteria relating to usage is met and/or the predetermined length of time has elapsed.

Although FIG. 4 shows the age verification test that is performed in response to the smoking substitute device being disabled in response to a predetermined criteria relating to usage being met, an additional (e.g. manual) age verification test may be performed at random by an entity responsible for providing the user with the smoking substitute device, e.g. to ensure that the age verification test was validly passed by the user.

Figure 6:
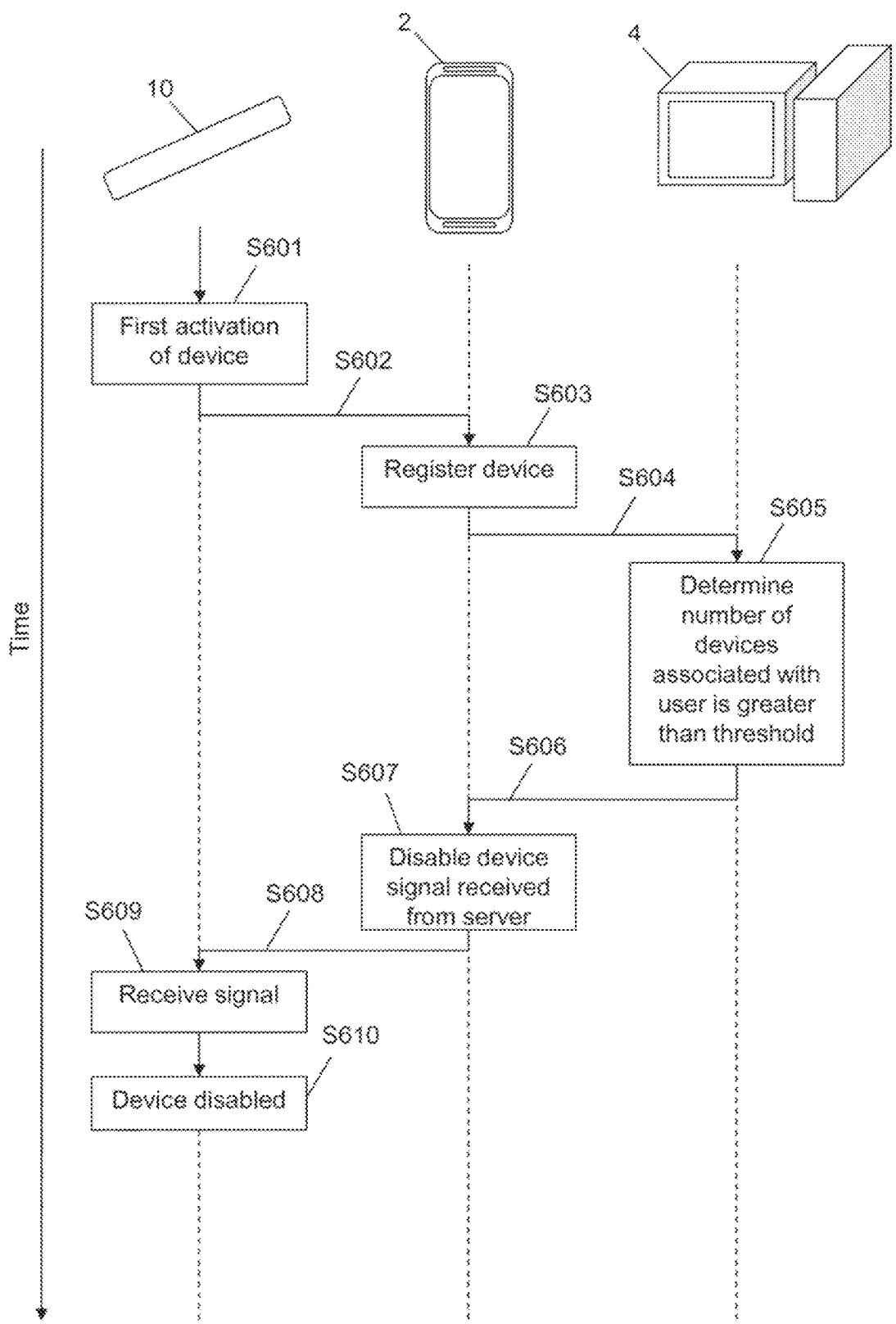
FIG. 6 is another network flow diagram illustrating the present disclosure.

FIG. 6 is a network flow diagram illustrating an embodiment of the present disclosure. The steps in FIG. 6 may be run in parallel to or instead of the steps in FIG. 4.

In a first step, S601, the device is activated for the first time. As discussed above, first activation may be implemented through plural methods. This step may be performed in parallel to, or be the same as, the equivalent step, S401, in FIG. 4.

Subsequent to the activation, the smoking substitute device transmits (in step S602) a signal identifying the smoking substitute device to a mobile device 2. This signal may contain, for example, a unique identification number associated with the smoking substitute device. Upon receipt of this signal, the mobile device registers the smoking substitute device in step S603 and associates the smoking substitute device with a user, e.g. by registering the smoking substitute device with a vendor account belonging to the user.

In step S604, the mobile device 2 transmits either: the identification of the smoking substitute device, or a signal indicating that a further smoking substitute device has been associated with the user, to a remote server 4. In response, in step S605, the remote server determines whether or not the number of devices associated with the user (e.g. registered to a vendor account belonging to the user) has exceeded a threshold. If the threshold is not exceeded, no further action is taken. If the threshold is exceeded, the remote server 4 transmits a signal (in step S606) to the mobile device 2 indicating that the threshold has been exceeded.

Whilst not shown, in an alternative example step S605 may be performed by the mobile device 2 and not by the remote server 4. In such an example, the mobile device 2 may maintain a store of all smoking substitute devices associated with the user.

Upon receipt of this signal, in step S607, the mobile device 2 prepares and sends (step S608) a signal to the smoking substitute device indicating that the smoking substitute device should disable itself.

The smoking substitute device receives the signal in step S609, and subsequently, in step S510 disables itself.

As will be appreciated, steps S601, S602, S609, and S610 may be performed by the control unit 130 of the smoking substitute device. Steps S603-S608 may be performed entirely by the mobile device 2, entirely by the remote server 4, or by a combination of the mobile device and remote server.

The threshold may be set at a value to discourage a user from purchasing and reselling smoking substitute devices to users who are not of the required age. For example, the threshold may be set as 100 smoking substitute devices, 75 smoking substitute devices, 50 smoking substitute devices, or 20 smoking substitute devices.

Figure 7:
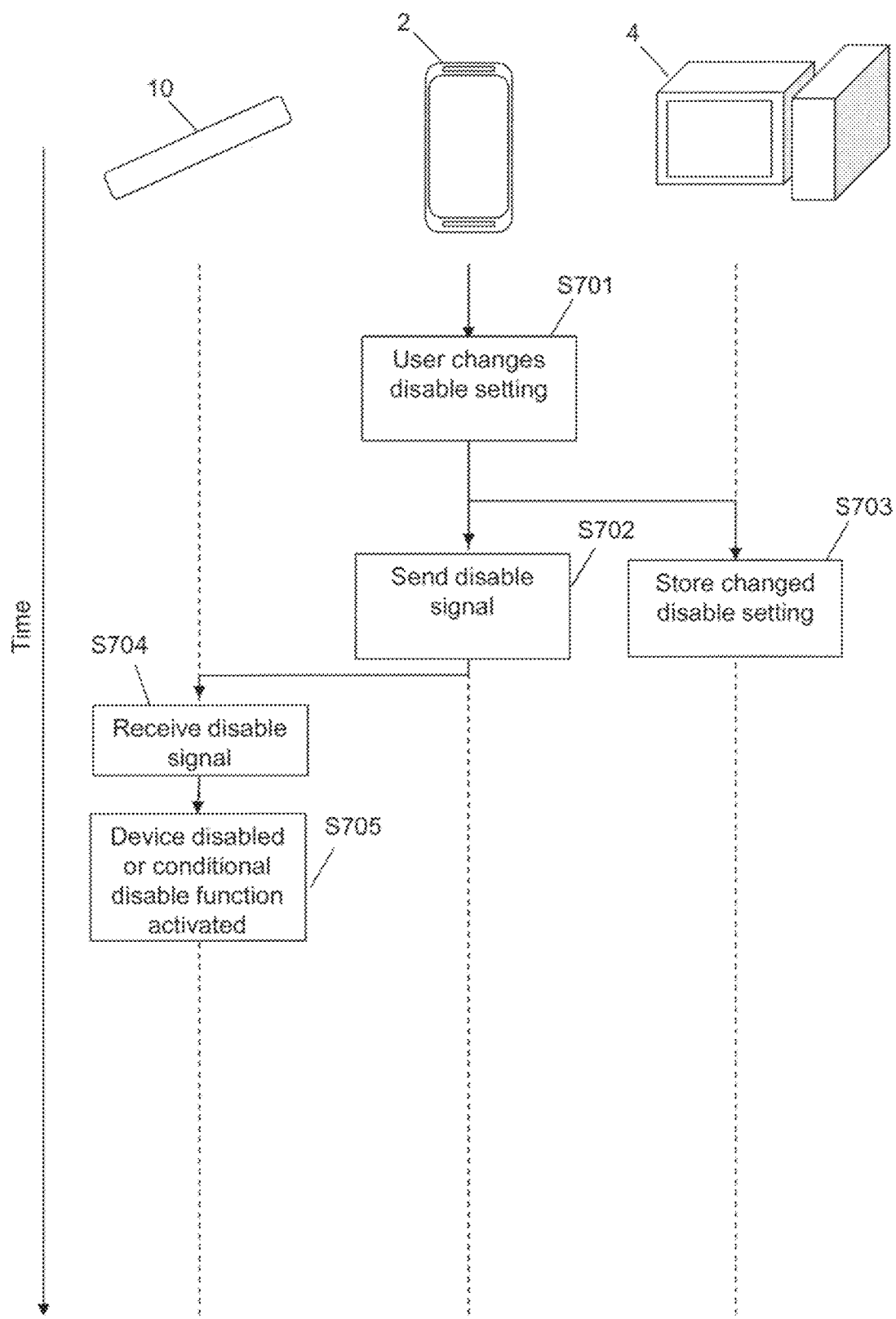
FIG. 7 is another network flow diagram illustrating the present disclosure.

FIG. 7 is a network flow diagram illustrating an embodiment of the present disclosure. The steps in FIG. 7 may be run in parallel to or instead of the steps in FIG. 4 and/or FIG. 6.

In a first step, S701, a user changes a disable setting via a user interface provided on a display screen of the mobile device 2 (e.g. via the application installed on the mobile device 2).

In a second step S702, the mobile device 2 sends a disable signal to the smoking substitute device, in response to the user changing the disable setting via the user interface. The disable signal sent to the smoking substitute device 10 may be a conditional or unconditional disable signal. Examples of such signals have already been discussed in detail, above.

In certain non-limiting embodiments, the disable signal is sent from the mobile device 2 to the smoking substitute device 10 via a wireless connection established between the smoking substitute device 10 and the mobile device 2.

The wireless connection between the smoking substitute device 10 and the mobile device 2 may be established e.g. by, for example, performing some predetermined action at the smoking substitute device 10 to put the smoking substitute device into a mode where it advertises its availability to make a new wireless connection, and the application installed on the mobile device 2 seeking to establish the wireless connection, e.g. by a user instructing the application to seek a wireless connection with the smoking substitute device 10 through a user interface provided on a display screen of the mobile device 2 (e.g. via the application installed on the mobile device 2). Pairing processes to establish a wireless connection are well-known, and typically use Bluetooth. In some examples, the predetermined action performed at the smoking substitute device 10 to put the smoking substitute device into a mode where it advertises its availability to make a new wireless connection could be a predetermined gesture (e.g. shake to pair) which is detected by the one or more movement detection devices included in the smoking substitute device 10, or by performing a predetermined sequence of one or more actuations of an actuator included in the smoking substitute device 10.

In optional step S703, the mobile device 2 may send to the remote server 4 the changed disable setting as set by the user. In this way, the remote server 4 can store one or more disable settings associated with the user which can be pushed out to a new smoking substitute device later acquired by the user (e.g. when the user registers their new device with their vendor account), without the user having to re-enter their chosen settings.

In step S704, the disable signal is received at the smoking substitute device 10.

In step S705, the control unit 130 of the smoking substitute device 10: disables the smoking substitute device 10, if the disable signal received at the smoking substitute device 10 is an unconditional disable signal; or activates a conditional disable function on the smoking substitute device, if the disable signal received at the smoking substitute device 10 is a conditional disable signal.

Conditional disable functions have already been discussed in detail above, and are further discussed below in relation to FIGS. 9 and 10(*a*)-(*e*).

Figure 8:
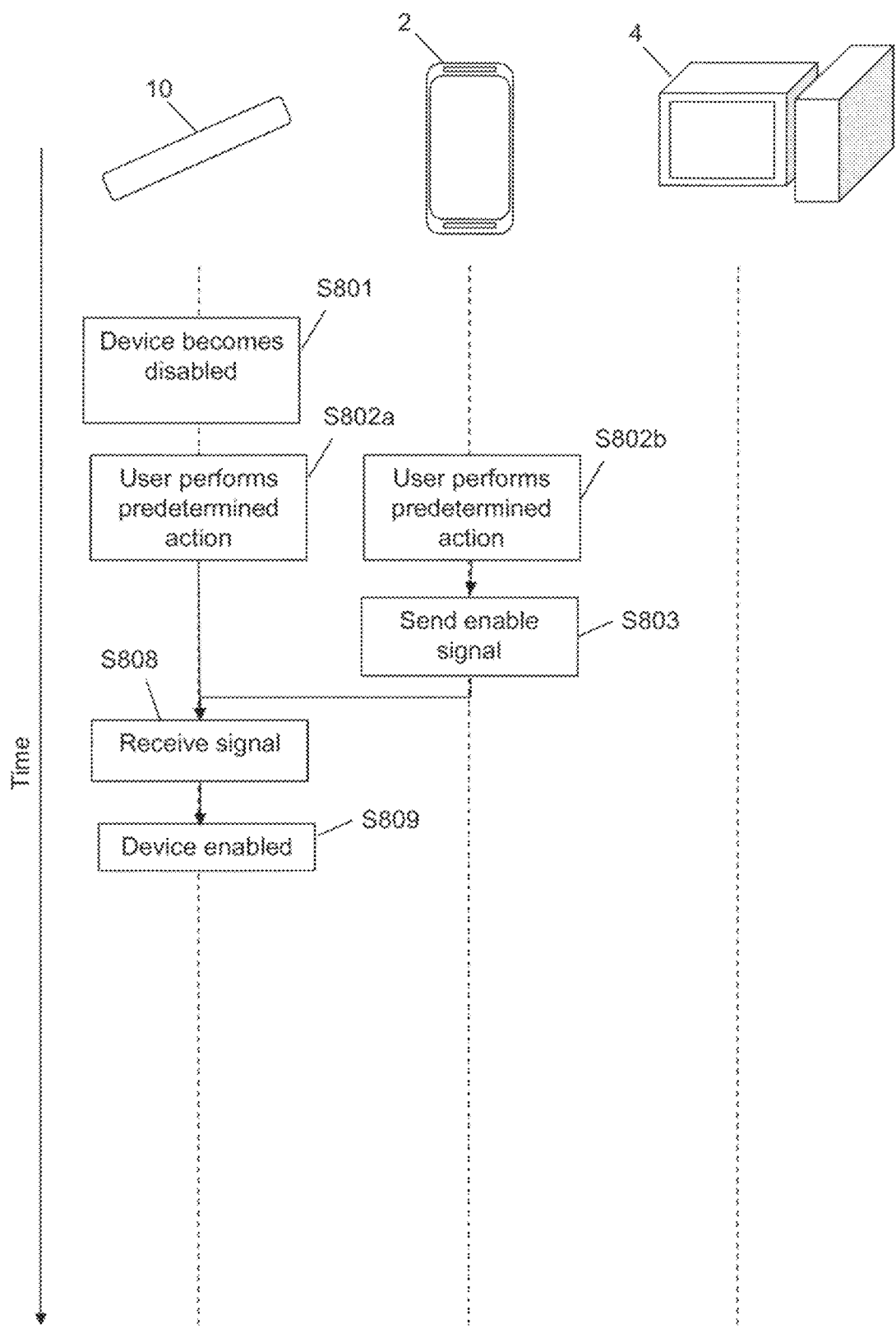
FIG. 8 is another network flow diagram illustrating the present disclosure.

FIG. 8 is a network flow diagram illustrating an embodiment of the present disclosure. The steps in FIG. 8 may be run in parallel to or instead of the steps in FIG. 4, FIG. 6 and/or FIG. 7.

In step S801 of FIG. 8, the smoking substitute device 10 becomes disabled. This may occur e.g. because of a process as set out with reference to any one of FIG. 4, 6 or 7, for example.

In step S802*a*, the user performs a predetermined action at the smoking substitute device 10, e.g. a predetermined gesture performed with the smoking substitute device 10.

Figure 9:
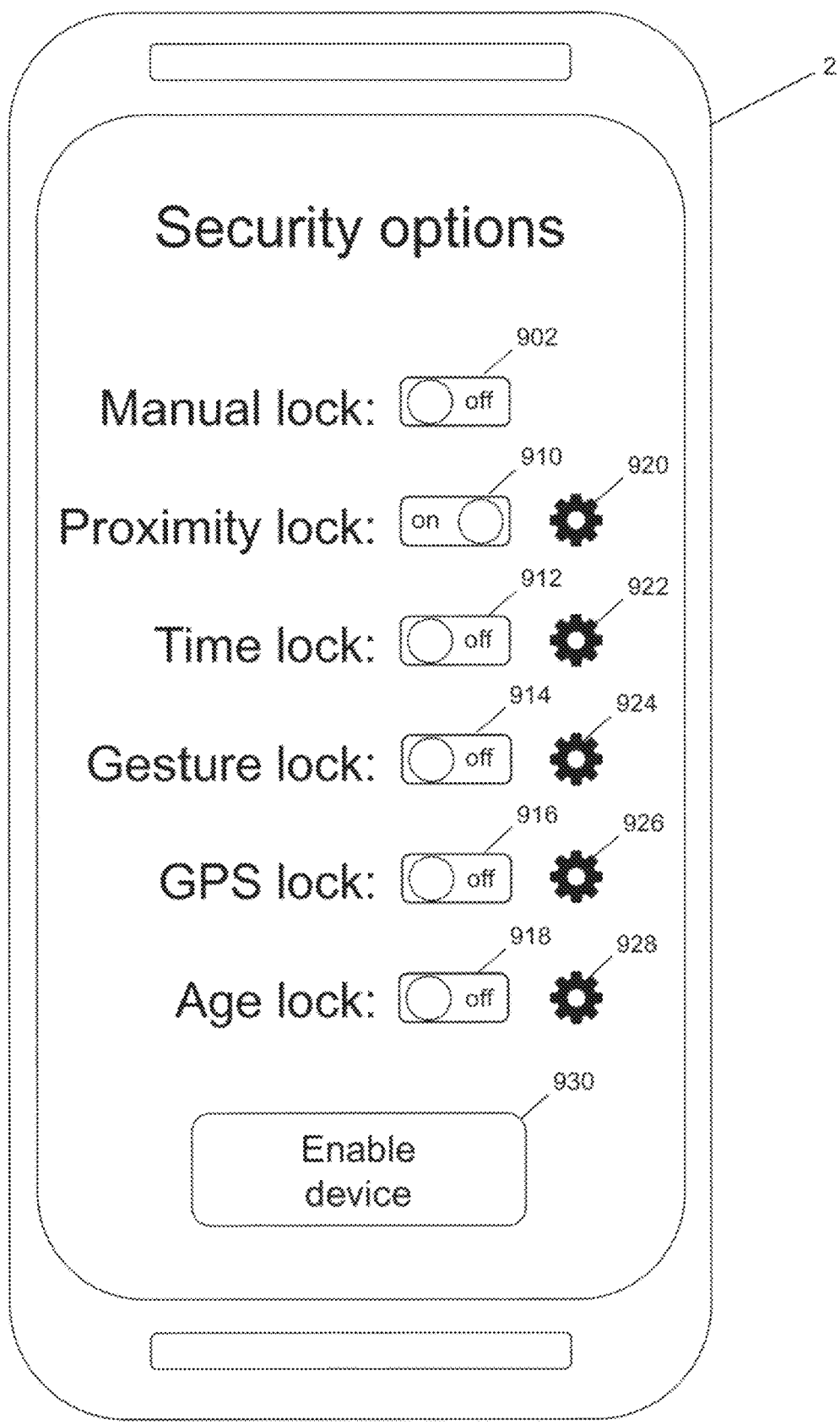
FIG. 9 shows a user interface on a mobile device wherein the user interface provides a user with one or more disable settings that can be changed by the user.
Figure 10A:
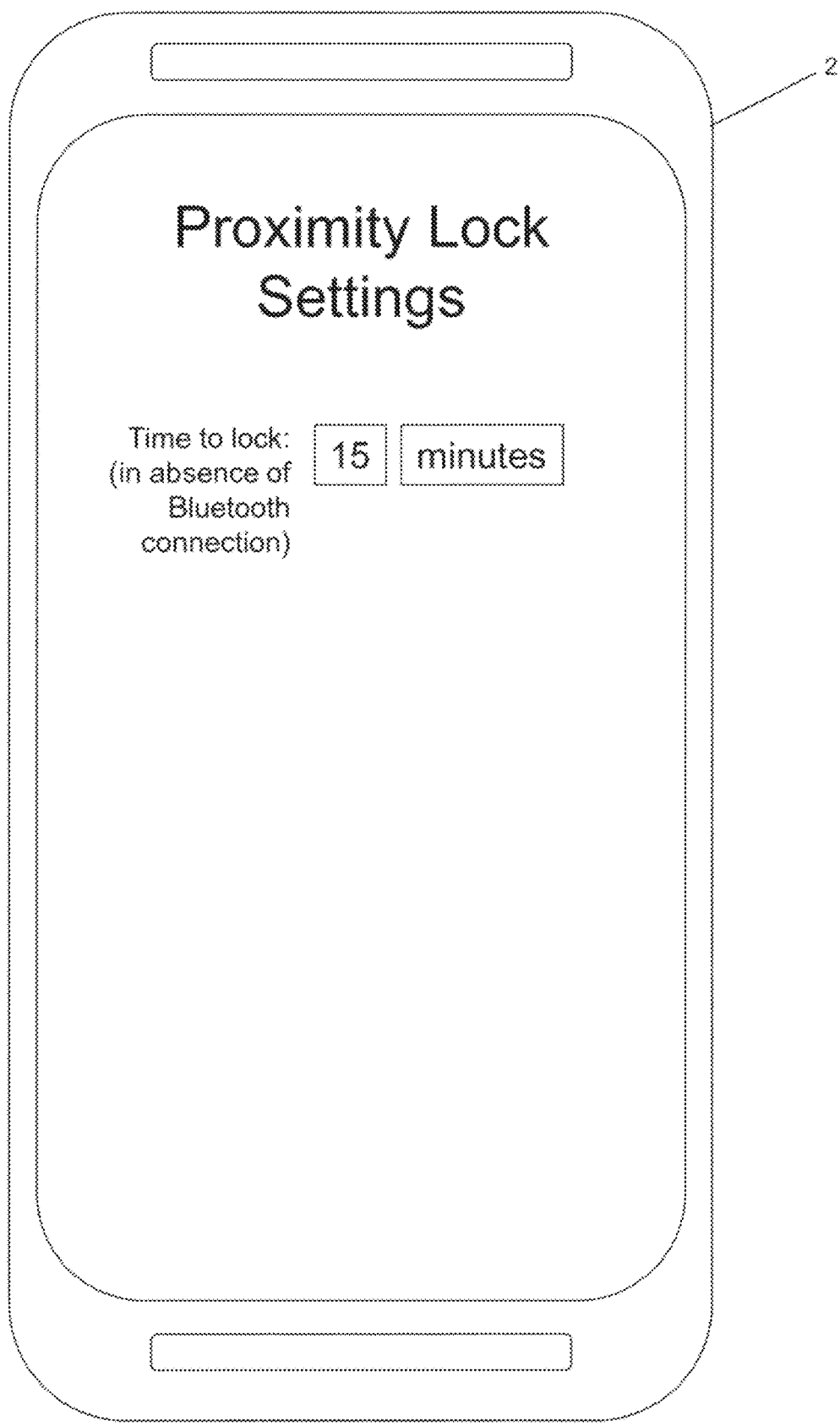
FIG. 10(a) shows a user interface on a mobile device wherein the user interface allows a user to change one or more settings associated with a proximity lock function.
Figure 10B:
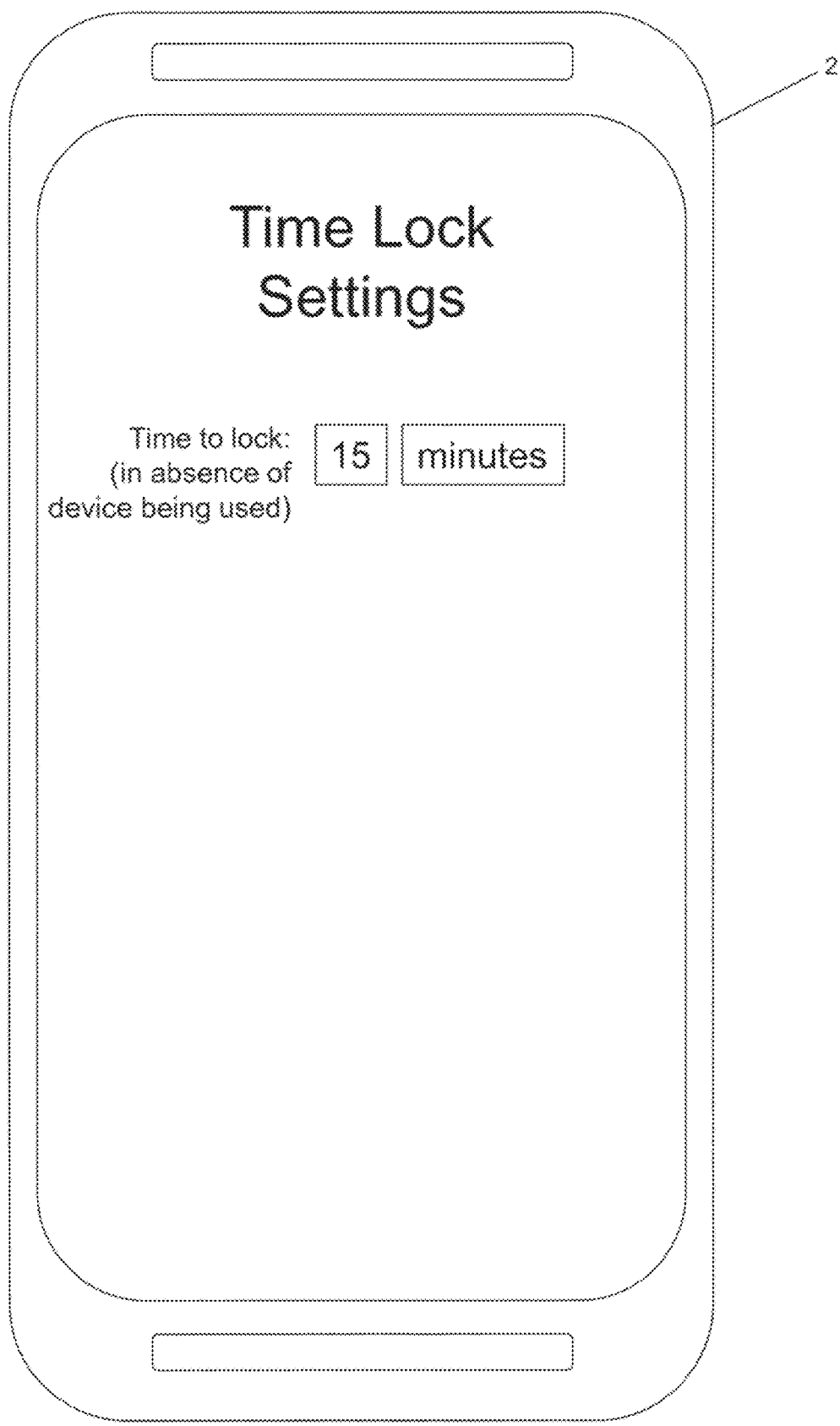
FIG. 10(b) shows a user interface on a mobile device wherein the user interface allows a user to change one or more settings associated with a time lock function.
Figure 10C:
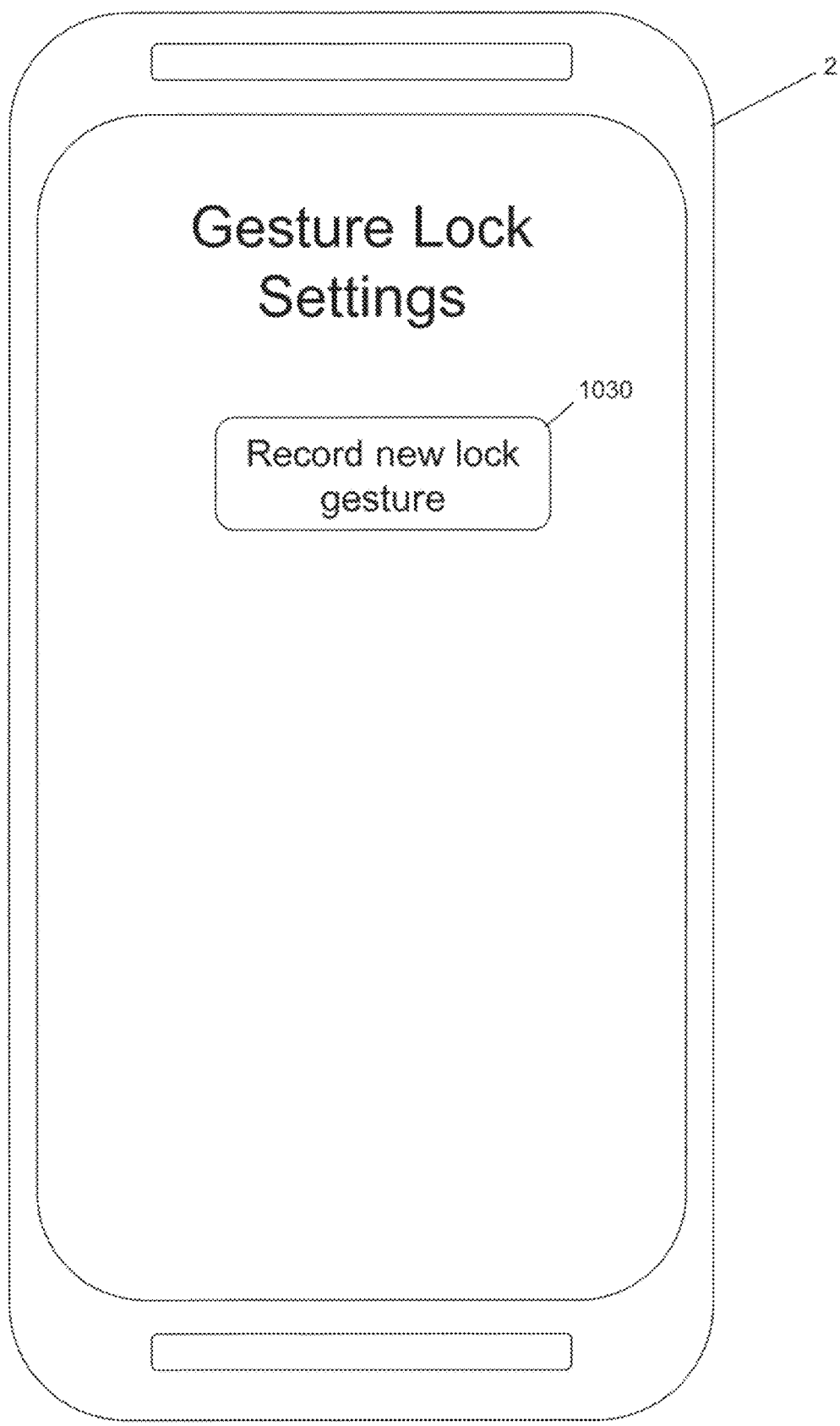
FIG. 10(c) shows a user interface on a mobile device wherein the user interface allows a user to change one or more settings associated with a gesture lock function.
Figure 10D:
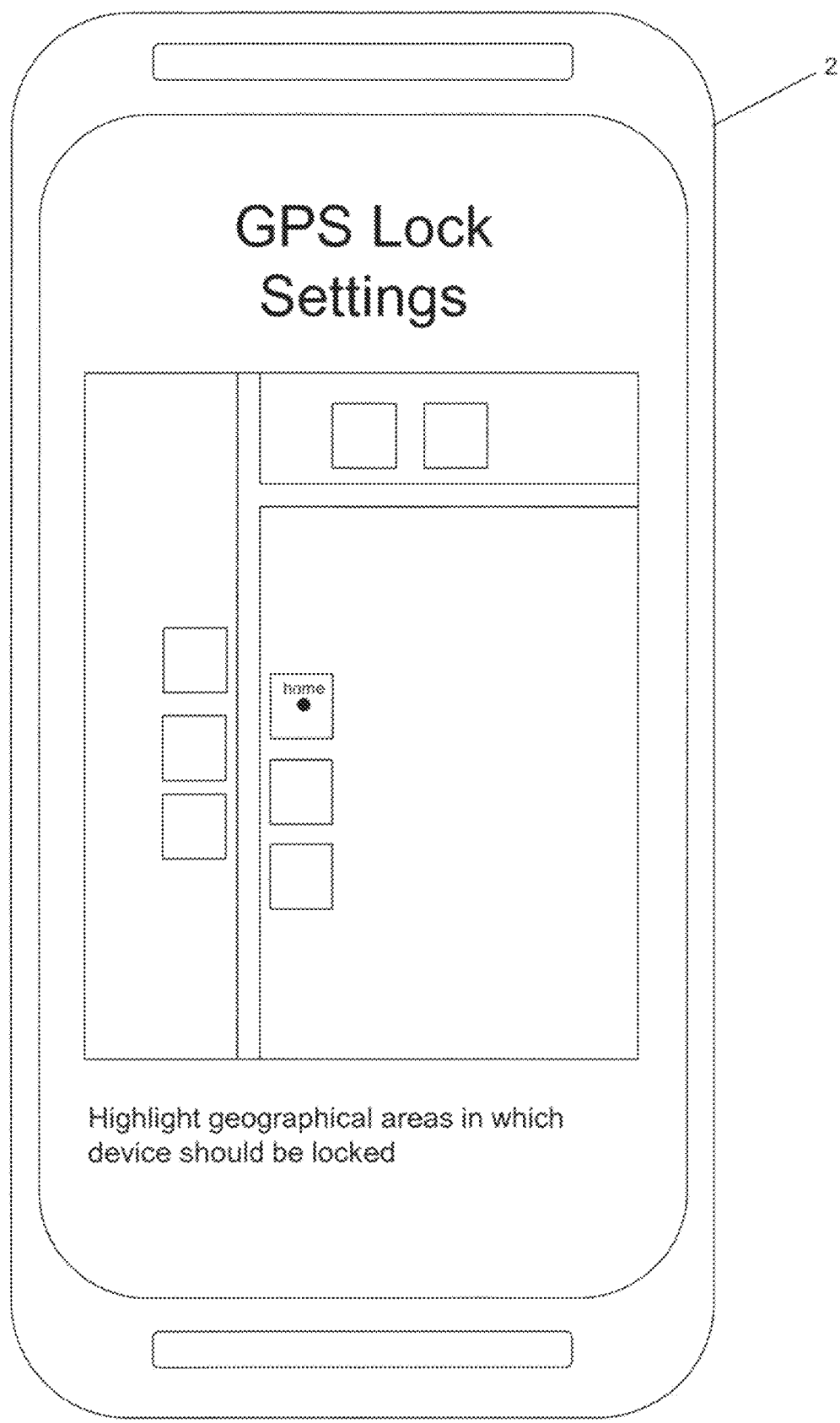
FIG. 10(d) shows a user interface on a mobile device wherein the user interface allows a user to change one or more settings associated with a geographic lock function (which in FIG. 10(d) is referred to as a "GPS lock function").
Figure 10E:
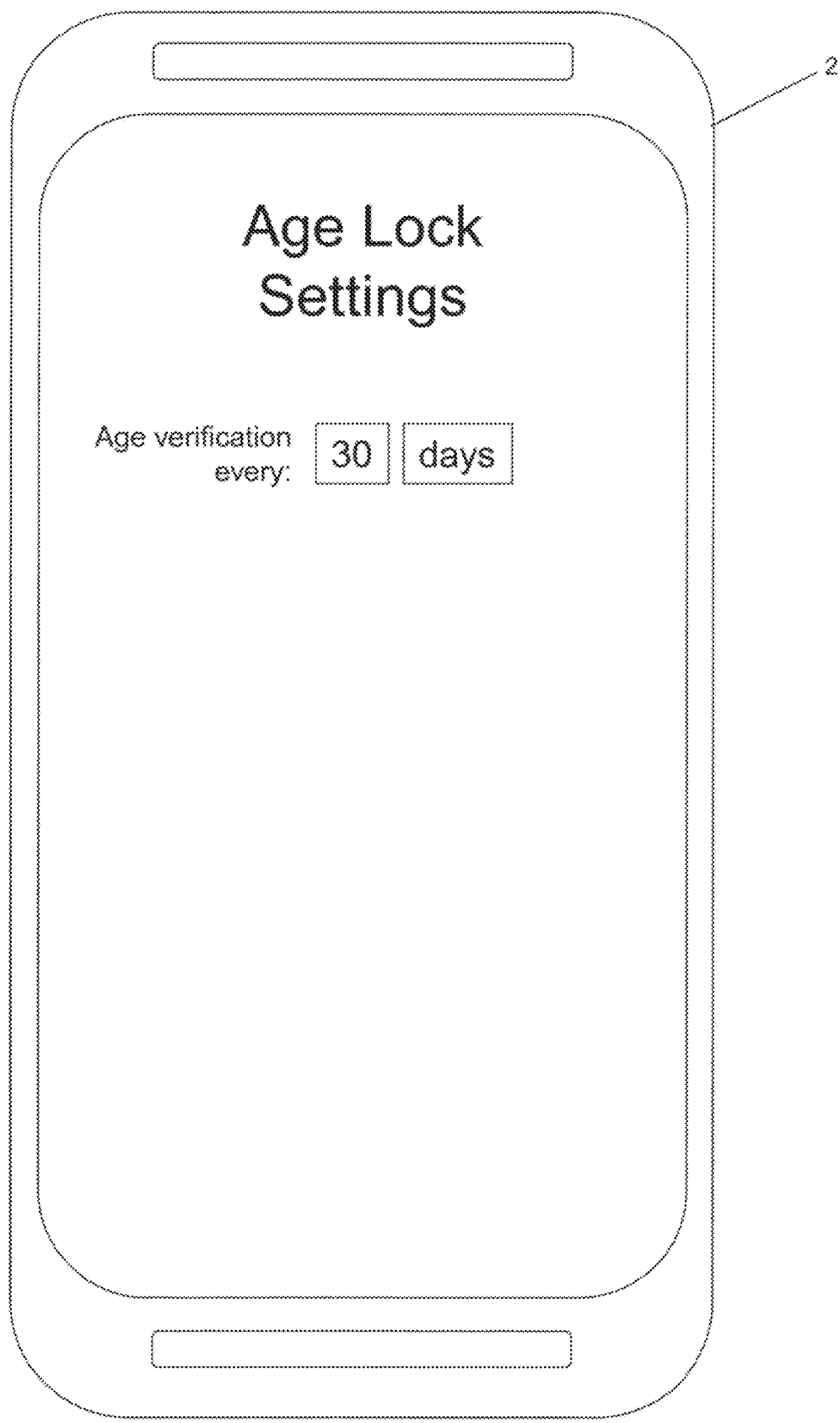
FIG. 10(e) shows a user interface on a mobile device wherein the user interface allows a user to change one or more settings associated with an age lock function.

Alternatively, in step S802*b*, the user performs a predetermined action at the mobile device 2, e.g. instructing the enabling of the smoking substitute device 10 via a user interface provided by a display screen of the mobile device 2 (see button 930 in FIG. 9, for example). This is followed by step S803, in which the mobile device 2 sends an enable signal to the smoking substitute device 10, which is then received by the smoking substitute device 10.

In step S804, in response to step S802*a* or S802*b*, the control unit 130 of the smoking substitute device 10 enables the smoking substitute device 10, unless the smoking substitute device 10 was disabled pending successful performance of a further verification process (i.e. a verification other than that performed in step S802*a* or S802*b*), which could for example be an age verification test (as was the case for the process discussed above with reference to FIG. 4).

FIG. 9 shows an example user interface that could allow a user to change various disable settings, here in the form of toggle switches, including: a manual lock toggle 902 for changing a manual lock setting (switching this toggle to "on" triggers the mobile device 2 into sending an unconditional disable signal to the smoking substitute device 10); a proximity lock toggle 910 for changing a proximity lock setting (switching this toggle to "on" triggers the mobile device 2 into sending an conditional disable signal to activate a proximity lock function on the smoking substitute device 10); a time lock toggle 912 for changing a time lock setting (switching this toggle to "on" triggers the mobile device 2 into sending an conditional disable signal to activate a time lock function on the smoking substitute device 10); a gesture lock toggle 914 for changing a gesture lock setting (switching this toggle to "on" triggers the mobile device 2 into sending an conditional disable signal to activate a gesture lock function on the smoking substitute device 10); a geographic (here shown as "GPS") lock toggle 916 for changing a geographic lock setting (switching this toggle to "on" triggers the mobile device 2 into sending an conditional disable signal to activate a geographic lock function on the smoking substitute device 10); an age lock toggle 918 for changing an age lock setting (switching this toggle to "on" triggers the mobile device 2 into sending an conditional disable signal to activate an age lock function on the smoking substitute device 10).

Also shown in FIG. 9 is a button 930 that can be pressed to enable a disabled device, corresponding to step S802*b* in FIG. 8. This button 930 may be unavailable (e.g. greyed out or not shown) if the smoking substitute device 10 has been disabled pending successful performance of a further verification process (see above). One or more of the toggles 902, 910, 912, 914, 916, 918 may be unavailable (e.g. greyed or not shown) if the smoking substitute device 10 is currently disabled.

Also shown in FIG. 9 are settings buttons 920, 922, 924, 926, 928 that allow settings associated with the conditional disable functions to be changed.

FIG. 10(*a*) shows a user interface on the mobile device 2 that allows a user to change one or more settings associated with a proximity lock function. This user interface can be accessed via settings button 920 shown on FIG. 9. As shown, the time before the device locks in the absence of a wireless connection (when the proximity lock function is activated) can be set via this interface.

FIG. 10(*b*) shows a user interface on the mobile device 2 that allows a user to change one or more settings associated with a time lock function. This user interface can be accessed via settings button 922 shown on FIG. 9. As shown, the time before the device locks in the absence of being used (when the time lock function is activated) can be set via this interface.

FIG. 10(*c*) shows a user interface on the mobile device 2 that allows a user to change one or more settings associated with a gesture lock function This user interface can be accessed via settings button 924 shown on FIG. 9. As shown, a new gesture for locking the smoking substitute device (when the gesture lock function is activated) can be recorded by pressing the relevant button 1030.

FIG. 10(*d*) shows a user interface on the mobile device 2 that allows a user to change one or more settings associated with a geographic lock function (which in FIG. 10(*d*) is referred to as a "GPS lock function"). This user interface can be accessed via settings button 926 shown on FIG. 9. As shown, a new geographical area in which the device will become locked (when the geographic lock function is activated) can be selected via a maps interface, which could be a typical maps interface known in the art, e.g. Google Maps. The area could be selected by dragging out a square shape on the map.

FIG. 10(*e*) shows a user interface on the mobile device 2 that allows a user to change one or more settings associated with an age lock function. This user interface can be accessed via settings button 928 shown on FIG. 9. As shown, the time before the device requires additional age verification (when the age lock function is activated) can be set via this interface. The age lock function and associated user interface features may be omitted, in some examples of the present disclosure.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For example, whilst the examples discussed above are implemented in a smoking substitute device 10 that includes a main body 110 and a consumable 150, an implementation in a smoking substitute device that is refillable and does not include a consumable 150 could also be envisaged.

Similarly, as noted previously, the present disclosure could be implemented in an HNB device.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include," and variations such as "comprises," "comprising," and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

LIST OF FEATURES

1 System
2 Mobile device
4 Application server
6 Docking station
8 Network
10 Smoking substitute device
110 Smoking substitute device
120 Main body
122 Top end of main body
124 Bottom end of main body
126 Light
128 Slot
130 Control unit
132 Memory
134 Wireless interface
136 Electrical interface
138 Additional components
140 Power source
150 Consumable
152 Top end of consumable
154 Bottom end of consumable
156 Tank
158 Window
160 Electrical interface
162 Heating device
164 Air inlets
166 Mouthpiece
168 Additional components

The invention claimed is:

1. A system for managing a smoking substitute device, the system comprising:
a smoking substitute device; and
a mobile device configured to have a wireless connection with the smoking substitute device;
wherein the system is configured to activate a geographic lock function on the smoking substitute device thereby disabling the smoking substitute device if the smoking substitute device and/or the mobile device is determined to have a geographical location that is within one or more predetermined geographical areas; and
wherein the smoking substitute device and/or the mobile device is configured to, after the smoking substitute device has been disabled, enable the smoking substitute device in response to a predetermined action being performed by a user using the smoking substitute device and/or the mobile device so as to show that the user is authorized to use the smoking substitute device.

2. The system according to claim 1, wherein the one or more predetermined geographical areas are set by the user of the mobile device.

3. The system according to claim 2, wherein the one or more predetermined geographical areas are set by the user of the mobile device via an application installed on the mobile device.

4. The system according to claim 3, wherein the one or more predetermined geographical areas are set by the user of the mobile device by the user using a map interface of the application to:
select one or more first geographical areas in which the smoking substitute device should be disabled; and/or
select one or more second geographical areas in which the smoking substitute device should not be disabled.

5. The system according to claim 1, wherein the one or more predetermined geographical areas include a particular geographical area within a predetermined distance of a home location.

6. The system according to claim 1, wherein the mobile device is configured to send a disable signal to the smoking substitute device so as to activate the geographic lock function on the smoking substitute device if the mobile device is determined to have the geographical location that is within the one or more predetermined geographical areas.

7. The system according to claim 1, wherein the smoking substitute device is configured to activate the geographic lock function on the smoking substitute device if the smoking substitute device is determined to have the geographical location that is within the one or more predetermined geographical areas, even if the smoking substitute device does not have the wireless connection to the mobile device.

8. A system for managing a smoking substitute device, the system comprising:
- a smoking substitute device; and
- a mobile device configured to have a wireless connection with the smoking substitute device;
- wherein the system is configured to activate a geographic lock function on the smoking substitute device thereby disabling the smoking substitute device if the smoking substitute device and/or the mobile device is determined to have a geographical location that is within one or more predetermined geographical areas; and
- wherein the smoking substitute device and/or the mobile device is configured to, after the smoking substitute device has been disabled, enable the smoking substitute device in response to a predetermined action being performed by a user using the smoking substitute device and/or the mobile device so as to show that the user is authorized to use the smoking substitute device, unless the smoking substitute device has been disabled pending successful performance of a further verification process.

9. The system according to claim 8, wherein the further verification process is an age verification test.

10. The system according to claim 8, wherein the smoking substitute device is configured to be disabled pending successful performance of the further verification process by setting an indicator on the smoking substitute device to indicate that the smoking substitute device is disabled pending successful performance of the further verification process.

11. The system according to claim 10, wherein the smoking substitute device is configured to set the indicator when a predetermined criteria relating to usage of the smoking substitute device is met and/or a predetermined length of time has elapsed.

12. The system according to claim 10, wherein the indicator is not set when the geographic lock function disables the smoking substitute device.

* * * * *